(12) United States Patent
Vangura

(10) Patent No.: US 11,533,997 B2
(45) Date of Patent: Dec. 27, 2022

(54) LAMINATE COUNTERTOP WITH SYNTHETIC POLYMER SUBSTRATE

(71) Applicant: Vangura Kitchen Tops, Inc., North Huntingdon, PA (US)

(72) Inventor: Edward P. Vangura, North Huntingdon, PA (US)

(73) Assignee: Vangura Kitchen Tops, Inc., North Huntingdon, PA (US)

( * ) Notice: Subject to any disclaimer, the term of this patent is extended or adjusted under 35 U.S.C. 154(b) by 0 days.

(21) Appl. No.: 17/179,963

(22) Filed: Feb. 19, 2021

(65) Prior Publication Data

US 2021/0169224 A1 Jun. 10, 2021

Related U.S. Application Data

(63) Continuation-in-part of application No. 16/700,454, filed on Dec. 2, 2019, now Pat. No. 10,994,515,
(Continued)

(51) Int. Cl.
*A47B 96/18* (2006.01)
*A47B 96/20* (2006.01)
(Continued)

(52) U.S. Cl.
CPC .......... *A47B 96/206* (2013.01); *A47B 96/18* (2013.01); *A47B 96/201* (2013.01); *B32B 3/04* (2013.01);
(Continued)

(58) Field of Classification Search
CPC ............ A47B 13/083; A47B 77/022; A47B 2077/027; A47B 96/18; A47B 96/201;
(Continued)

(56) References Cited

U.S. PATENT DOCUMENTS 3,580,770 A * 5/1971 Dyal ............... B29C 63/04
156/216
4,636,443 A 1/1987 Jaisle et al.
(Continued)

OTHER PUBLICATIONS

"Microcellular Plastics Lab", faculty.washington.edu/vkumar/microcel/intro.html, Aug. 2007. Author Unknown. (Year: 2007).*

*Primary Examiner* — Michael A Tolin
(74) *Attorney, Agent, or Firm* — The Webb Law Firm

(57) ABSTRACT

A laminate countertop with a curved edge profile includes a base support including a synthetic polymer material. The synthetic polymer material can be a closed-cell polymer foam. The base support includes a top surface, a bottom surface, opposing longitudinal sides, at least one of which comprises the curved edge profile, and opposing latitudinal sides. The countertop also includes a laminate cover formed from a cured resin material adhered to and covering at least a portion of the top surface and at least a portion of the curved edge profile of the base support. A method for forming the laminate countertop includes steps of providing the base support and adhering the laminate cover over at least a portion of the top surface and a portion of the curved edge profile of the base support.

18 Claims, 32 Drawing Sheets

Related U.S. Application Data which is a continuation-in-part of application No. 15/700,697, filed on Sep. 11, 2017, now Pat. No. 10,492,600.

(60) Provisional application No. 62/979,788, filed on Feb. 21, 2020.

(51) Int. Cl.

| | |
|---|---|
| *B29L 31/44* | (2006.01) |
| *B32B 27/06* | (2006.01) |
| *B32B 3/04* | (2006.01) |
| *B32B 3/08* | (2006.01) |
| *B32B 37/12* | (2006.01) |
| *B32B 5/18* | (2006.01) |
| *B32B 7/12* | (2006.01) |
| *B32B 38/00* | (2006.01) |
| *B29D 99/00* | (2010.01) |

(52) U.S. Cl.
CPC .................. *B32B 3/08* (2013.01); *B32B 5/18* (2013.01); *B32B 7/12* (2013.01); *B32B 27/065* (2013.01); *B32B 37/12* (2013.01); *B32B 38/0004* (2013.01); *B29D 99/0039* (2013.01); *B29L 2031/441* (2013.01); *B32B 2266/0235* (2013.01); *B32B 2266/08* (2013.01); *B32B 2307/54* (2013.01); *B32B 2307/72* (2013.01); *B32B 2327/06* (2013.01)

(58) Field of Classification Search
CPC .......... A47B 96/205; A47B 96/206; B29D 99/0039; B29L 2031/441; B32B 3/02; B32B 3/04; B32B 3/08; B32B 3/266; B32B 3/28; B32B 5/02; B32B 5/18; B32B 5/245; B32B 5/26; B32B 7/12; B32B 21/042; B32B 21/06; B32B 21/08; B32B 21/10; B32B 21/14; B32B 27/065; B32B 27/08; B32B 29/005; B32B 29/007; B32B 37/12; B32B 38/0004; B32B 2250/02; B32B 2250/44; B32B 2260/021; B32B 2260/023; B32B 2260/028; B32B 2260/046; B32B 2266/0235; B32B 2266/08; B32B 2307/402; B32B 2307/54; B32B 2307/72; B32B 2307/7265; B32B 2307/732; B32B 2327/06; B32B 2419/00
See application file for complete search history.

(56) References Cited

U.S. PATENT DOCUMENTS

| | | | |
|---|---|---|---|
| 5,037,694 A | 8/1991 | Ungar et al. | |
| 5,253,932 A * | 10/1993 | Nesovic | A47B 96/18 108/27 |
| 5,667,740 A * | 9/1997 | Spydevold | B29C 44/083 264/54 |
| 6,096,410 A | 8/2000 | Okajima et al. | |
| 6,131,521 A * | 10/2000 | Nelson | A47B 77/022 108/27 |
| 6,139,945 A | 10/2000 | Krejchi et al. | |
| 6,286,577 B1 | 9/2001 | Douglas et al. | |
| 6,803,110 B2 | 10/2004 | Drees et al. | |
| 7,754,120 B2 | 7/2010 | Kessing | |
| 8,245,380 B2 | 8/2012 | Ramamurthy et al. | |
| 8,313,824 B2 | 11/2012 | Yokochi et al. | |
| 9,113,710 B2 * | 8/2015 | Sidoti | A47B 96/201 |
| 2002/0056235 A1 * | 5/2002 | Olson | E06B 9/02 49/464 |
| 2003/0087080 A1 | 5/2003 | Horwitz | |
| 2006/0264523 A1 * | 11/2006 | Lee | C08K 3/346 521/99 |
| 2008/0105661 A1 * | 5/2008 | Kirkwood | B23K 3/087 219/121.64 |
| 2008/0245464 A1 | 10/2008 | Hazelwood | |

\* cited by examiner

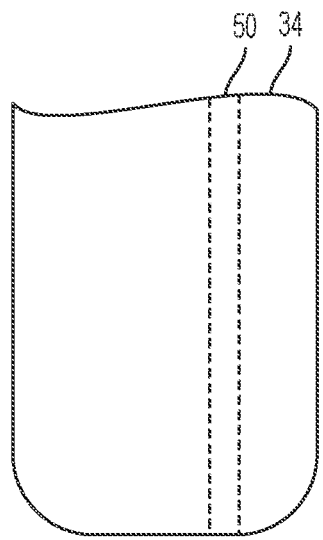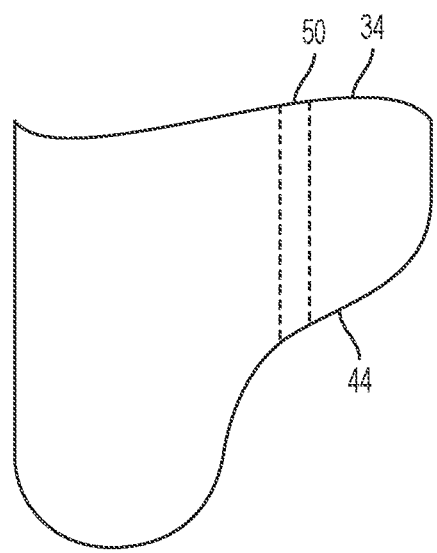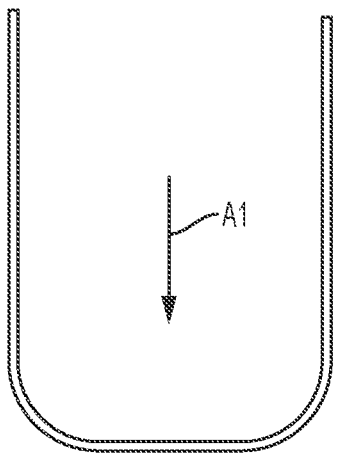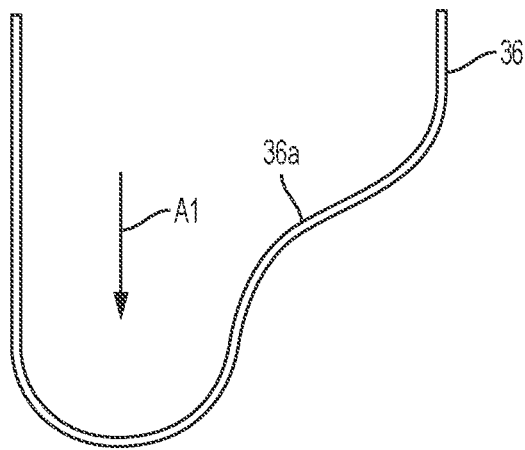
FIG. 8A        FIG. 8B

LAMINATE COUNTERTOP WITH SYNTHETIC POLYMER SUBSTRATE

CROSS REFERENCE TO RELATED APPLICATIONS

The present application is a continuation-in-part of U.S. patent application Ser. No. 16/700,454, entitled "Method for Forming a Laminate Countertop," filed Dec. 2, 2019, which is a continuation-in-part of U.S. patent application Ser. No. 15/700,697, entitled "Method for Forming a Laminate Countertop," filed Sep. 11, 2017, which issued as U.S. Pat. No. 10,492,600 on Dec. 3, 2019, the disclosures of each of which are hereby incorporated by reference in its entirety.

Also, the present application claims priority to U.S. Provisional Patent Application Pub. No. 62/979,788, entitled "Laminate Countertop with Extruded Polymeric Core," filed Feb. 21, 2020, the disclosure of which is hereby incorporated by reference in its entirety.

BACKGROUND OF THE INVENTION

Field of the Invention

The invention relates generally to laminate countertops and, particularly, to laminate countertops including a polymeric substrate or core. The invention also relates generally to methods for forming a laminate countertop including a polymeric substrate or core and, in particular, to a method of forming a laminate countertop with a polymeric substrate or core having a curved edge profile extending around at least one irregular or angled corner.

Description of Related Art

Countertops for kitchens, bars, workspaces, desks, and bathrooms can be made from a variety of natural and synthetic materials including natural stones, engineered stone, synthetic solid surface materials, and laminated constructions. Luxury and high-end installations often use natural stones, such as granite or marble, as such materials are believed to be more durable and aesthetically pleasing than manmade alternatives. Countertops formed from synthetic solid surface materials, such as engineered stone or Corian® manufactured by E.I. DuPont, are also available at similar high-end price points. Solid surface materials are synthetic composite materials formed from a combination of natural stone dust (e.g., marble dust), acrylic polymers, epoxy or polyester resins, and similar materials. It is often used to produce a seamless countertop. For example, Corian® is a solid surface material formed from a cured mixture of acrylic polymer and alumina derived from, for example, bauxite ore.

Natural stone and solid surface countertops are generally believed to be more durable than laminate materials. For example, natural stone and solid surfaces do not degrade or deform when exposed to moisture or humidity, as can occur with laminate countertops mounted to wood or composite wood substrates. In addition, natural stone and solid surface materials can be molded or carved with a variety of ornate edge shapes desired by consumers. For example, natural stone countertops are cut from stone slabs using computer controlled cutting machinery, as is known in the art. The computer-controlled machinery is capable of carving complex curved edge profiles on edges of the countertop. Countertops formed from synthetic solid surface materials can also be made with curved edge profiles, which can be formed by carving the synthetic solid surface material or by molding the curved edge profile during production of the synthetic material. Advantageously, carved or molded decorative edges can extend around adjacent sides of the countertop to create more aesthetically pleasing designs.

Construction grade and lower priced installations often use laminate countertops formed by laminating a curable resin sheet to a wood board or a wood composite substrate to form a countertop. Beneficially, such laminate countertops are easy to clean, generally non-porous to avoid staining, and can be manufactured in a wide variety of colors and texture patterns. Laminate countertops have been available for many years from numerous sources including The Diller Corporation under the Formica® brand name and WilsonArt Engineered Surfaces. Exemplary laminate countertops are described, for example, in U.S. Pat. No. 4,636,443 to Jaisle et al. entitled "Decorative Laminates and Method of Producing the Same" and in U.S. Pat. No. 6,286,577 to Douglas et al. entitled "Process for Fabricating Countertops," each of which is incorporated by reference in its entirety.

While laminate countertops are available in colors and designs made to resemble natural stone, several significant differences between natural or synthetic stone material countertops and laminate countertops mean that consumers can easily identify laminate countertops from more expensive alternatives. One difference is that laminate countertops can degrade causing the laminate to separate from the substrate when exposed to moisture for extended periods as occurs, for example, in humid coastal areas. Another difference between laminate countertops and more expensive alternatives is the appearance of the edges of the countertop. Conventional laminate countertops are formed with a curved edge profile along a longitudinal side thereof. For example, a laminate countertop can be formed by forming a substrate or base support with the decorative curved edge profile and then adhering a flexible sheet of curable resin to the substrate, such that the sheet presses against and adopts the curved edge profile of the longitudinal sides. However, due to the natural bend and flexibility of the sheet, the sheet cannot be bent over latitudinal sides of the base support. As such, latitudinal sides of laminate countertops are generally flat vertical surfaces covered by a separate piece of laminate material. The differences in edge profile between latitudinal and longitudinal sides of a countertop are especially noticeable for kitchen islands and similar structures, which are positioned in a center of a room where three or four sides of the countertop are easily visible. In order to avoid having different edge profiles, consumers often choose to use solid stone surfaces for kitchen islands rather than lower priced laminate alternatives.

For these reasons, there is a need for new laminate countertops and methods of forming laminate countertops that closely resemble more expensive natural stone and solid surface material alternatives.

SUMMARY OF THE INVENTION

According to an example of the disclosure, a method of forming a laminate countertop with a curved edge profile extending around at least two adjacent sides thereof is provided. The method includes providing a base support having a top surface, a bottom surface, opposing latitudinal sides, and opposing longitudinal sides. At least one of the longitudinal sides includes a curved edge profile. The method further includes adhering a laminate sheet to the base support to form a laminate cover over at least a portion of the top surface and a portion of the curved edge profile of the base support, and mounting a preformed edge member having a curved edge profile to one of the sides of the base support to form a laminate countertop having curved edges extending around at least two adjacent sides of the countertop. In order to align the preformed edge member and the base support, the preformed edge member is mounted to a brace to remove bowing or curvature from the preformed edge member. The brace includes at least a body portion having a curved longitudinal surface configured to be pressed against at least a portion of the curved edge profile of the preformed edge member and at least a hook for pulling the preformed edge member against the body of the brace to remove the bowing or curvature from the preformed edge member.

According to another example of the disclosure, a method of forming an edge member for a laminate countertop having a curved edge profile includes cutting the curved edge profile on a front side of a plug having a square or rectangular cross section; stamping a flexible laminate sheet by pressing a die having the curved edge profile against the sheet to produce a pre-stamped laminate cover having the curved edge profile; adhering the laminate cover to the curved edge profile of the plug using an adhesive; attaching a brace to the plug and to the laminate cover to hold the laminate cover against the plug in a desired position; and after the adhesive cures and while the brace remains attached to the plug and laminate cover, making a longitudinal cut along a rear side of the plug to form a preformed edge member of a desired thickness.

According to another example of the disclosure, a laminate countertop having a curved edge profile extending around at least three sides of the countertop includes a base support having a top surface, a bottom surface, opposing longitudinal sides, at least one of which comprises the curved edge profile, and opposing latitudinal sides. The countertop further includes a laminate cover formed from a cured resin material adhered to and covering at least a portion of the top surface and at least a portion of the curved edge profile of the base support. The method also includes at least one preformed edge member having the curved edge profile connected to at least one of the latitudinal sides of the base support to form the edge profile extending around the at least three sides of the countertop. In some examples, the preformed edge member includes a plug having an upper lip, a lower lip, and a central portion between the upper and lower lips. An outer surface of the upper lip can include the curved edge profile. The preformed edge member also includes a pre-stamped laminate cover formed from the cured resin material stamped in the curved edge profile adhered to the outer surface of the upper lip of the plug.

According to an aspect of the disclosure, a method of forming a laminate countertop with at least one angled corner includes a step of providing a laminate countertop with at least one substantially square corner having a curved edge profile extending around the at least one square corner. The countertop includes a base support having a top surface, a bottom surface, opposing latitudinal sides, and opposing longitudinal sides. At least one of the longitudinal sides defines a curved edge profile. The countertop also includes: a laminate cover over at least a portion of the top surface and a portion of the curved edge profile of the base support; and at least one straight preformed straight edge member including the curved edge profile mounted to one of the latitudinal sides of the base support. The method further includes steps of: cutting a first angled slot through a portion of the at least one preformed straight edge member; cutting a second angled slot through a portion of a longitudinal side of the countertop; and cutting a connecting cut between the slots to form a cutout section of the countertop. The cutout section includes at least a portion of the square corner. The method also includes a step of adhering at least one preformed angled edge member including the curved edge profile into the cutout section of the countertop to form at least one angled corner, thereby forming a laminate countertop having an edge profile extending around the at least one angled corner.

According to another aspect of the disclosure, a laminate countertop having at least one angled corner and a curved edge profile extending around the at least one angled corner includes a base support having a top surface, a bottom surface, opposing longitudinal sides, at least one of which includes or defines the curved edge profile, opposing latitudinal sides, and at least one cutout section at a corner of the base support between one of the longitudinal sides and one of the latitudinal sides thereof. The laminate countertop also includes a laminate cover formed from a cured resin material adhered to and covering at least a portion of the top surface and at least a portion of the curved edge profile of the base support; at least one preformed straight edge member having the curved edge profile connected to at least one of the latitudinal sides of the base support; and at least one angled preformed straight edge member having the curved edge profile connected to the cutout section of the base support to form a curved edge profile extending around at least one angled corner of the laminate countertop.

According to another aspect of the disclosure, a laminate countertop with a curved edge profile includes a base support including a synthetic polymer material. The base support includes a top surface, a bottom surface, opposing longitudinal sides, at least one of which comprises the curved edge profile, and opposing latitudinal sides. The countertop also includes a laminate cover formed from a cured resin material adhered to and covering at least a portion of the top surface and at least a portion of the curved edge profile of the base support.

According to another aspect of the disclosure, a method of forming a laminate countertop includes providing a base support formed from a synthetic polymer material. The base support includes a top surface, a bottom surface, opposing latitudinal sides, and opposing longitudinal sides. At least one of the longitudinal sides comprises a curved edge profile. The method also includes adhering a laminate cover over at least a portion of the top surface and a portion of the curved edge profile of the base support to form the laminate countertop.

Non-limiting examples of the present invention will now be described in the following numbered clauses:

Clause 1: A method of forming a laminate countertop with a curved edge profile extending around at least two adjacent sides thereof, the method comprising: providing a base support comprising a top surface, a bottom surface, opposing latitudinal sides, and opposing longitudinal sides, wherein at least one of the longitudinal sides comprises a curved edge profile; adhering a laminate sheet to the base support to form a laminate cover over at least a portion of the top surface and a portion of the curved edge profile of the base support; and mounting a preformed edge member comprising a curved edge profile to one of the sides of the base support to form a laminate countertop having curved edges extending around at least two adjacent sides of the countertop, wherein, in order to align the preformed edge member and the base support, the preformed edge member is mounted to a brace to remove bowing or curvature from the preformed edge member, and wherein the brace comprises at least a body portion having a curved longitudinal surface configured to be pressed against at least a portion of the curved edge profile of the preformed edge member, and at least a hook for pulling the preformed edge member against the body of the brace to remove the bowing or curvature from the preformed edge member.

Clause 2: The method of clause 1, wherein the base support is between about 40 inches and about 60 inches wide.

Clause 3: The method of clause 1 or clause 2, further comprising forming a backsplash by folding a portion of the base support and laminate cover adjacent to one of the longitudinal sides to form a substantially vertical surface relative to the top surface of the base support.

Clause 4: The method of any of clauses 1-3, wherein the base support comprises a wood board or a composite material formed from a laminate of wood material, and wherein the base support has a thickness of between about 0.5 inch and 2.0 inches.

Clause 5: The method of any of clauses 1-4, wherein the curved edge profile comprises a decorative profile comprising at least two convexly curved portions.

Clause 6: The method of clause 5, wherein the curved edge profile further comprises a flat vertical or angled surface between the convexly curved portions.

Clause 7: The method of any of clauses 1-6, wherein the edge member has a longitudinal length of between about 40 inches and about 60 inches, and preferably about 50 inches.

Clause 8: The method of any of clauses 1-7, wherein mounting the brace to the edge member comprises inserting a portion of the hook into a corresponding hole on a bottom surface of the edge member and tightening the hook to draw the edge member toward the body portion of the brace.

Clause 9: The method of any of clauses 1-8, further comprising forming the preformed edge member prior to mounting the preformed edge member to the base support, wherein forming the preformed edge member comprises: cutting the curved edge profile on a front side of a plug having a square or rectangular cross section; stamping a flexible laminate sheet by pressing a die having the curved edge profile against the sheet to produce a pre-stamped laminate cover having the curved edge profile; adhering the pre-stamped laminate cover to the curved edge profile of the plug using an adhesive; attaching a brace to the plug and to the laminate cover to hold the laminate cover against the plug in a desired position; and after the adhesive dries or cures and while the brace remains attached to the plug and laminate cover, making a longitudinal cut along a rear side of the plug to form a preformed edge member of a desired thickness.

Clause 10: The method of clause 9, wherein the adhesive comprises an epoxy resin.

Clause 11: The method of clause 9 or clause 10, wherein stamping the flexible laminate sheet comprises heating the sheet to increase flexibility of the sheet prior to pressing the die against the sheet.

Clause 12: The method of any of clauses 9-11, further comprising, prior to adhering the laminate cover to the plug, drilling a plurality of weep holes extending between front and rear sides of the plug for receiving excess adhesive.

Clause 13: The method of any of clauses 9-12, wherein the plug comprises a wood board or a composite board formed from a laminate wood material.

Clause 14: The method of any of clauses 9-13, further comprising, after making the longitudinal cut, cutting latitudinal sides of the edge member at an angle relative to a longitudinal axis of the plug so that the edge member can be connected to the base support.

Clause 15: The method of any of clauses 9-14, wherein making the longitudinal cut comprises cutting a groove from the rear side of the plug to form a plug comprising an upper lip, a lower lip, and a central portion between the upper and lower lips Clause 16: The method of clause 15, wherein an angle between an inwardly directed surface of the upper lip and a top surface of the lower lip is between about 60° and 100°.

Clause 17: The method of clause 15 or clause 16, wherein cutting the groove from the rear side of the plug comprises cutting a first cut with a first rotating saw blade followed by cutting a second cut with a second rotating saw blade.

Clause 18: The method of clause 17, wherein the first cut is a substantially vertical cut and the second cut is a substantially horizontal cut.

Clause 19: A method of forming an edge member for a laminate countertop having a curved edge profile, comprising: cutting the curved edge profile on a front side of a plug having a square or rectangular cross section; stamping a flexible laminate sheet by pressing a die having the curved edge profile against the sheet to produce a pre-stamped laminate cover having the curved edge profile; adhering the laminate cover to the curved edge profile of the plug using an adhesive; attaching a brace to the plug and to the laminate cover to hold the laminate cover against the plug in a desired position; and after the adhesive cures and while the brace remains attached to the plug and laminate cover, making a longitudinal cut along a rear side of the plug to form a preformed edge member of a desired thickness.

Clause 20: The method of clause 19, wherein stamping the flexible laminate sheet comprises heating the sheet to increase flexibility of the sheet prior to pressing the stamp against the sheet.

Clause 21: The method of clause 19 or clause 20, further comprising, after making the longitudinal cut, cutting latitudinal sides of the edge member at an angle relative to a longitudinal axis of the plug so that the edge member can be connected to a countertop.

Clause 22: The method of any of clauses 19-21, wherein the brace comprises a body portion having the curved edge profile configured to be pressed against an outer surface of the pre-stamped laminate cover and at least a hook configured to pull the plug toward the body portion of the brace.

Clause 23: The method of clause 22, wherein attaching the brace to the plug comprises inserting a portion of the hook into a corresponding hole on a bottom surface of the plug and tightening the hook to draw the plug toward the body portion of the brace.

Clause 24: A laminate countertop having a curved edge profile extending around at least three sides of the countertop, comprising: a base support comprising a top surface, a bottom surface, opposing longitudinal sides, at least one of which comprises the curved edge profile, and opposing latitudinal sides; a laminate cover formed from a cured resin material adhered to and covering at least a portion of the top surface and at least a portion of the curved edge profile of the base support; and at least one preformed edge member having the curved edge profile connected to at least one of the latitudinal sides of the base support to form the edge profile extending around the at least three sides of the countertop, the preformed edge member comprising: a plug comprising an upper lip, a lower lip, and a central portion between the upper and lower lips, wherein an outer surface of the upper lip comprises the curved edge profile; and a pre-stamped laminate cover formed from the cured resin material stamped in the curved edge profile adhered to the outer surface of the upper lip of the plug.

Clause 25: A method of forming a laminate countertop with at least one angled corner, the method comprising: providing the laminate countertop with at least one substantially square corner having a curved edge profile extending around the at least one square corner, wherein the laminate countertop comprises: a base support comprising a top surface, a bottom surface, opposing latitudinal sides, and opposing longitudinal sides, wherein at least one of the longitudinal sides comprises a curved edge profile; a laminate cover over at least a portion of the top surface and a portion of the curved edge profile of the base support; and at least one straight preformed straight edge member comprising the curved edge profile mounted to one of the latitudinal sides of the base support; cutting a first angled slot through a portion of a longitudinal side of the countertop; cutting a second angled slot through a portion of the at least one preformed straight edge member; cutting a connecting cut between the slots to form a cutout section of the laminate countertop, the cutout section comprising at least a portion of the square corner; and adhering at least one preformed angled edge member comprising the curved edge profile into the cutout section of the laminate countertop to form at least one angled corner, thereby forming the laminate countertop having an edge profile extending around the at least one angled corner.

Clause 26: The method of clause 25, wherein the preformed straight edge member and/or the preformed angled edge member comprise: a plug comprising an upper lip, a lower lip, and a central portion between the upper and lower lips, wherein an outer surface of the upper lip comprises the curved edge profile; and a pre-stamped laminate cover formed from a cured resin material stamped in the curved edge profile adhered to the outer surface of the upper lip of the plug.

Clause 27: The method of clause 26, wherein the preformed angled edge member comprises angled sides angled at between about 30° and about 60° relative to a longitudinal axis of the preformed angled edge member.

Clause 28: The method of any of clauses 25-27, wherein the first angled slot is cut at an angle of from about 30° to about 60° relative to the longitudinal side of the laminate countertop and the second angled slot is cut at an angle of from about 30° to about 60° angle relative to the latitudinal side of the laminate countertop.

Clause 29: The method of any of clauses 25-28, wherein the first angled slot is cut with a router blade rotating in a first direction and the second angled slot is cut with a router blade rotating in a second direction opposite the first direction.

Clause 30: The method of any of clauses 25-29, further comprising: cutting a third slot through a portion of the longitudinal side of the base support, wherein the first slot is located between the third slot and the at least one square corner; and cutting a fourth slot through a portion of the preformed straight edge member, wherein the second slot is located between the fourth slot and the at least one square corner.

Clause 31: The method of clause 30, wherein cutting the connecting cut between the slots comprises: cutting a first straight segment of the connecting cut between the third slot and the first slot, cutting a second straight segment extending between the first slot and the second slot, and cutting a third straight segment extending from the second slot and the fourth slot.

Clause 32: The method of clause 31, wherein adhering the at least one preformed angled edge member into the cutout section comprises adhering first, second, and third angled edge members side by side in the cutout section, thereby forming an angled corner having a first angled surface, a second angled surface, a third angled surface, and a curved edge profile extending around the angled surfaces.

Clause 33: The method of clause 32, wherein the first, second, and third angled edge members have angled sides of about 30° relative to a longitudinal axis of the preformed angled edge member.

Clause 34: The method of any of clauses 25-33, wherein providing the laminate countertop comprises: providing the base support having the longitudinal side comprising the curved edge profile; adhering a laminate sheet to the base support to form the laminate cover over at least a portion of the top surface and a portion of the curved edge profile of the base support; and mounting the preformed straight edge member comprising the curved edge profile to one of the sides of the base support to form the laminate countertop having curved edges extending around the at least one square corner of the countertop.

Clause 35: The method of clause 34, wherein, in order to align the preformed straight edge member and the base support, the preformed straight edge member is mounted to a brace to remove bowing or curvature from the preformed straight edge member.

Clause 36: The method of clause 35, wherein the brace comprises at least a body portion having a curved longitudinal surface configured to be pressed against at least a portion of the curved edge profile of the preformed straight edge member, and at least a hook for pulling the preformed straight edge member against the body of the brace to remove the bowing or curvature from the preformed straight edge member.

Clause 37: A laminate countertop having at least one angled corner and a curved edge profile extending around the at least one angled corner, the laminate countertop comprising: a base support comprising a top surface, a bottom surface, opposing longitudinal sides, at least one of which comprises the curved edge profile, opposing latitudinal sides, and at least one cutout section at a corner of the base support between one of the longitudinal sides and one of the latitudinal sides thereof; a laminate cover formed from a cured resin material adhered to and covering at least a portion of the top surface and at least a portion of the curved edge profile of the base support; at least one preformed straight edge member having the curved edge profile connected to at least one of the latitudinal sides of the base support; and at least one angled preformed straight edge member having the curved edge profile connected to the at least one cutout section of the base support to form the curved edge profile extending around the at least one angled corner of the laminate countertop.

Clause 38: The laminate countertop of clause 37, wherein the countertop comprises a latitudinal seam extending between the preformed straight edge member and a surface of the laminate cover covering the base support and an angled seam extending between the preformed angled edge member and the surface of the laminate cover.

Clause 39: The laminate countertop of clause 38, wherein surfaces of the preformed straight edge member and/or the preformed angled edge member are not co-planar with the surface of the laminate cover covering the base support.

Clause 40: The laminate countertop of clause 38 or clause 39, wherein the longitudinal side of the base support is free of seams.

Clause 41: The laminate countertop of any of clauses 37-40, wherein the straight edge member and the angled edge member comprise: a plug comprising an upper lip, a lower lip, and a central portion between the upper and lower lips, wherein an outer surface of the upper lip comprises the curved edge profile; and a pre-stamped laminate cover formed from the cured resin material stamped in the curved edge profile adhered to the outer surface of the upper lip of the plug.

Clause 42: The laminate countertop of any of clauses 37-41, wherein the angled edge member comprises angled sides at an angle of from about 30° to 60° relative to a longitudinal axis of the angled edge member.

Clause 43: The laminate countertop of any of clauses 37-42, wherein the at least one angled edge member comprises a first angled edge member connected in the cutout section adjacent to the longitudinal side of the base support, a second angled edge member connected in the cutout section next to the first angled edge member, and a third angled edge member connected in the cutout section between the second angled edge member and the latitudinal side of the base support, thereby forming an angled corner having a first angled surface, a second angled surface, a third angled surface, and the curved edge profile extending around the angled surfaces.

Clause 44: The laminate countertop of clause 43, wherein the first, second, and third preformed angled edge member each have at least one angled side with an angle of about 30° relative to a longitudinal axis of the preformed angled edge member.

Clause 45: A laminate countertop with a curved edge profile, comprising: a base support comprising a synthetic polymer material, the base support having a top surface, a bottom surface, opposing longitudinal sides, at least one of which comprises the curved edge profile, and opposing latitudinal sides; and a laminate cover formed from a cured resin material adhered to and covering at least a portion of the top surface and at least a portion of the curved edge profile of the base support.

Clause 46: The laminate countertop of clause 45, wherein the base support is about 0.5 inch to about 1.0 inch (about 12.5 mm to about 25 mm) thick.

Clause 47: The laminate countertop of clause 45 or clause 46, wherein the synthetic polymer material comprises a closed-cell polyvinyl chloride foam.

Clause 48: The laminate countertop of clause 47, wherein the closed-cell polyvinyl chloride foam has a density of about 0.25-1.0 g/cm$^3$ and a tensile strength of less than about 20 MPa.

Clause 49: The laminate countertop of any of clauses 45-48, wherein the synthetic polymer material is substantially non-hygroscopic.

Clause 50: The laminate countertop of any of clauses 45-49, further comprising at least one preformed straight edge member having the curved edge profile connected to at least one of the latitudinal sides of the base support, such that the curved edge profile extends around a corner of the countertop.

Clause 51: The laminate countertop of clause 50, wherein the preformed straight edge member comprises: a plug comprising the synthetic polymer material having an upper lip, a lower lip, and a central portion between the upper and lower lips, wherein an outer surface of the upper lip comprises the curved edge profile; and a pre-stamped laminate cover formed from the cured resin material stamped in the curved edge profile adhered to the outer surface of the upper lip of the plug.

Clause 52: The laminate countertop of clause 51, wherein the synthetic polymer material comprises a closed-cell polyvinyl chloride foam.

Clause 53: The laminate countertop of clause 52, wherein the closed-cell polyvinyl chloride foam has a density of about 0.25-1.0 g/cm$^3$ and a tensile strength of less than about 20 MPa.

Clause 54: The laminate countertop of any of clauses 50-53, wherein the base support defines at least one cutout section at a corner of the base support between one of the longitudinal sides and one of the latitudinal sides thereof, the countertop further comprising at least one preformed angled edge member having the curved edge profile connected to the at least one cutout section of the base support to form the curved edge profile extending around an angled corner of the laminate countertop.

Clause 55: The laminate countertop of clause 54, wherein the preformed angled edge member comprises: a plug formed from the synthetic polymer material having an upper lip, a lower lip, and a central portion between the upper and lower lips, wherein an outer surface of the upper lip comprises the curved edge profile; and a pre-stamped laminate cover formed from the cured resin material stamped in the curved edge profile adhered to the outer surface of the upper lip of the plug.

Clause 56: The laminate countertop of clause 55, wherein the synthetic polymer material comprises a closed-cell polyvinyl chloride foam.

Clause 57: The laminate countertop of clause 56, wherein the closed-cell polyvinyl chloride foam has a density of about 0.25-1.0 g/cm$^3$ and a tensile strength of less than about 20 MPa.

Clause 58: A method of forming a laminate countertop, comprising: providing a base support formed from a synthetic polymer material, the base support comprising a top surface, a bottom surface, opposing latitudinal sides, and opposing longitudinal sides, wherein at least one of the longitudinal sides comprises a curved edge profile; and adhering a laminate cover over at least a portion of the top surface and a portion of the curved edge profile of the base support to form the laminate countertop.

Clause 59: The method of clause 58, wherein the base support is about 0.5 inch to about 1.0 inch (about 12.5 mm to about 25 mm) thick.

Clause 60: The method of clause 58 or clause 59, wherein the synthetic polymer material comprises a closed-cell polyvinyl chloride foam with a density of about 0.25-1.0 g/cm$^3$ and a tensile strength of less than about 20 MPa.

Clause 61: The method of any of clauses 58-60, further comprising mounting a preformed straight edge member having the curved edge profile to at least one of the latitudinal sides of the base support, such that the curved edge profile extends around at least one corner of the laminate countertop.

Clause 62: The method of clause 61, further comprising: cutting a first angled slot through a portion of a longitudinal side of the countertop; cutting a second angled slot through a portion of the preformed straight edge member; cutting a connecting cut between the slots to form a cutout section of the laminate countertop, the cutout section comprising at least a portion of the at least one corner of the laminate countertop; and adhering at least one preformed angled edge member comprising the curved edge profile into the cutout section of the laminate countertop to form at least one angled corner, thereby forming the laminate countertop having an edge profile extending around an angled corner of the countertop.

Clause 63: The method of clause 62, wherein the preformed straight edge member and/or the preformed angled edge member comprise: a plug formed from the synthetic polymer material comprising an upper lip, a lower lip, and a central portion between the upper and lower lips, wherein an outer surface of the upper lip comprises the curved edge profile; and a pre-stamped laminate cover formed from a cured resin material stamped in the curved edge profile adhered to the outer surface of the upper lip of the plug.

Clause 64: The method of clause 63, wherein the synthetic polymer material comprises a closed-cell polyvinyl chloride foam with a density of about 0.25-1.0 $g/cm^3$ and a tensile strength of less than about 20 MPa.

BRIEF DESCRIPTION OF THE DRAWINGS

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limit of the invention.

FIG. 8A is a schematic drawing of a plug and a stamped laminate cover of the countertop of FIG. 1A prior to forming an edge member, according to an aspect of the disclosure;

FIG. 8B is a schematic drawing of a plug and a stamped laminate cover of the countertop of FIG. 1B prior to forming an edge member, according to an aspect of the disclosure;

DETAILED DESCRIPTION

Figure 1A:
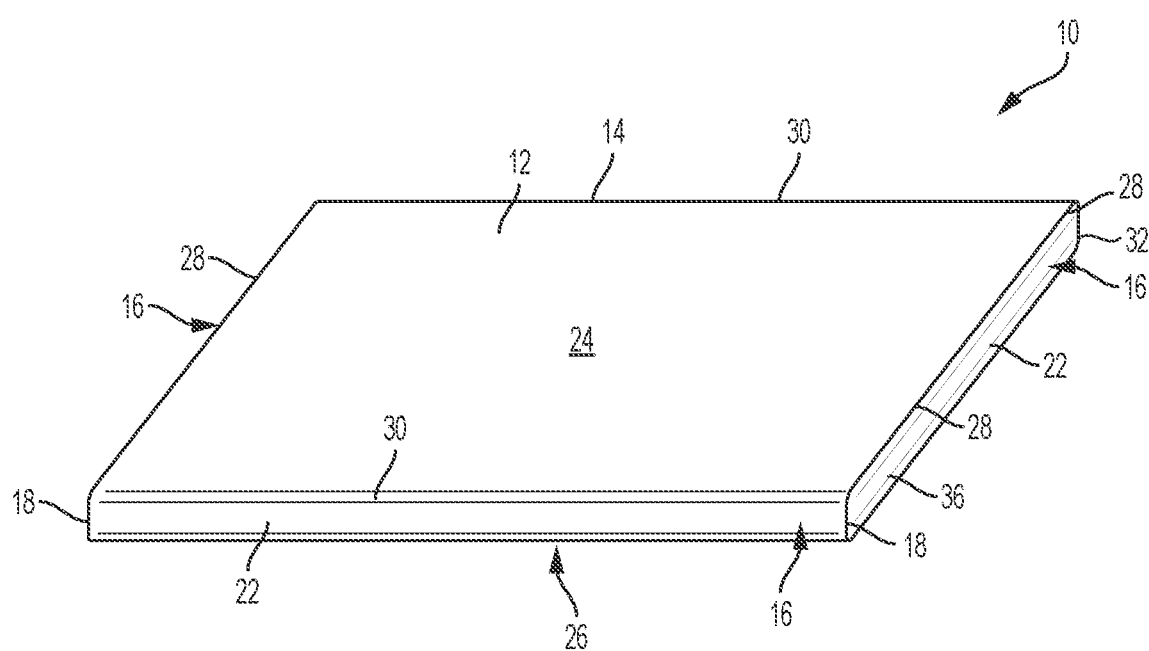
FIG. 1A is a perspective view of a laminate countertop with a curved edge profile, according to an aspect of the disclosure.
Figure 1B:
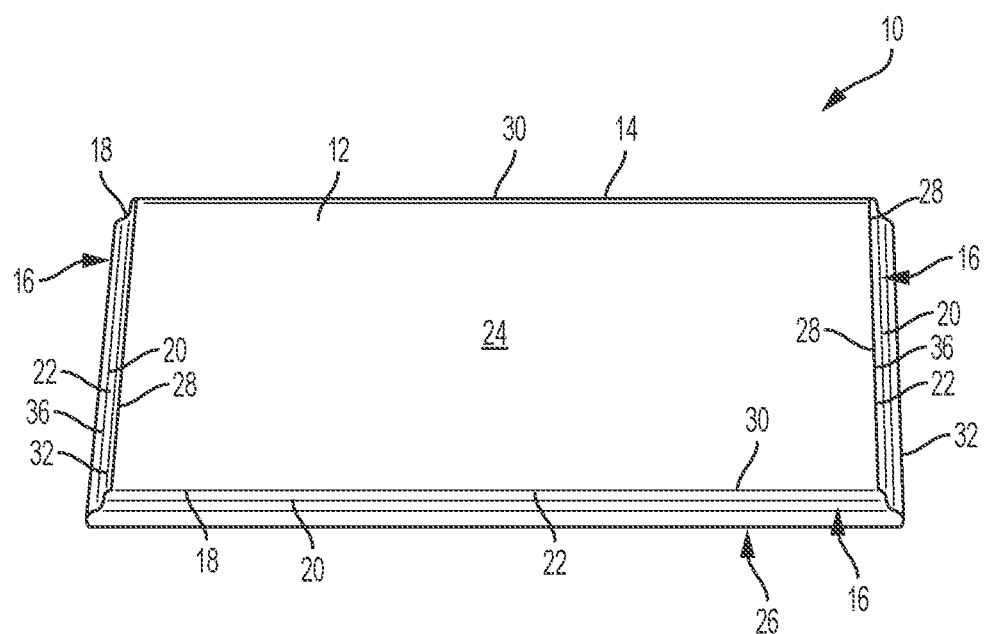
FIG. 1B is a perspective view of another example of a laminate countertop with another example of a curved edge profile, according to an aspect of the disclosure.
Figure 2A:
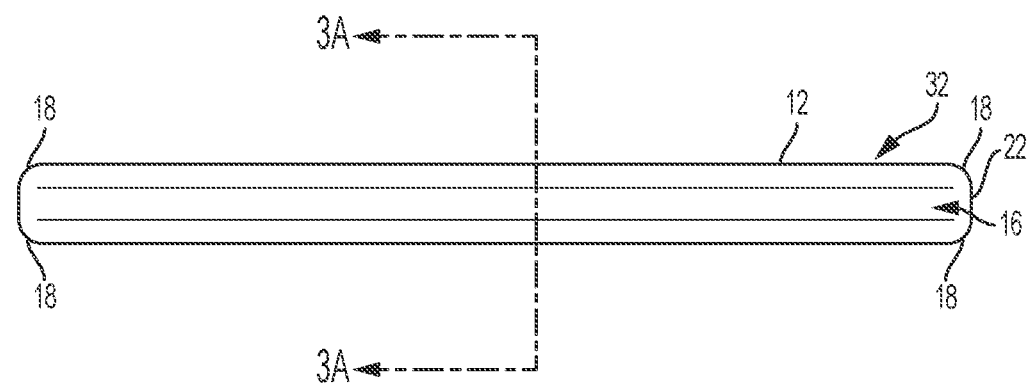
FIG. 2A is a side view of the laminate countertop of FIG. 1A.
Figure 2B:
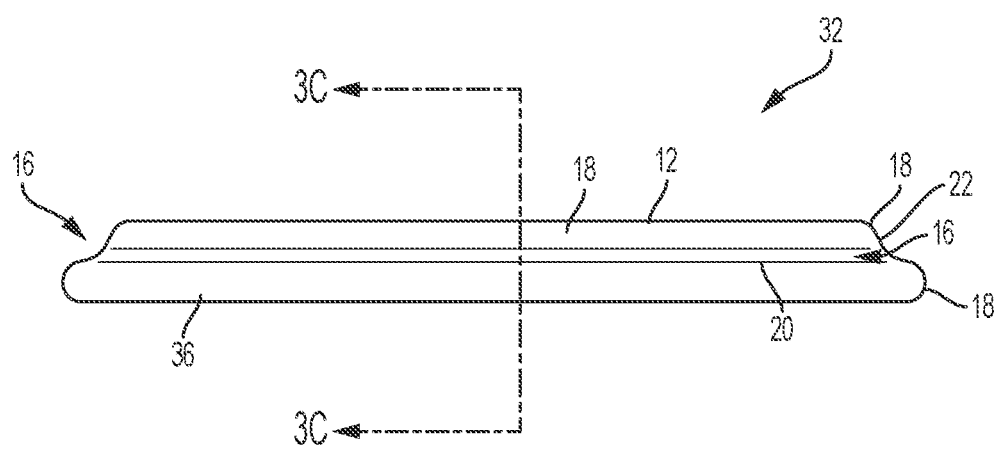
FIG. 2B is a side view of the laminate countertop of FIG. 1B.

As used herein, the singular form of "a", "an", and "the" include plural referents unless the context clearly dictates otherwise. For the purposes of this specification, unless otherwise indicated, all numbers expressing quantities of ingredients, reaction conditions, dimensions, physical characteristics, and so forth used in the specification and claims are to be understood as being modified in all instances by the term "about."

As used herein, the terms "right", "left", "top", and derivatives thereof shall relate to the invention as it is oriented in the drawing figures. The term "longitudinal" refers to a longest side or sides of a structure, which extend lengthwise rather than across the structure. The term "latitudinal" refers to a shorter side or sides of a structure which extend across the structure. However, it is to be understood that the invention can assume various alternative orientations and, accordingly, such terms are not to be considered as limiting. Also, it is to be understood that the invention can assume various alternative variations and stage sequences, except where expressly specified to the contrary. It is also to be understood that the specific devices and processes illustrated in the attached drawings, and described in the following specification, are examples. Hence, specific dimensions and other physical characteristics related to the embodiments disclosed herein are not to be considered as limiting.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all sub-ranges beginning with a minimum value equal to or greater than 1 and ending with a maximum value equal to or less than 10, and all sub-ranges in-between, e.g., 1 to 6.3, or 5.5 to 10, or 2.7 to 6.1.

A laminate countertop 10 and method of forming a laminate countertop 10 are disclosed herein. The laminate countertop 10 comprises a base substrate or support 14 and a laminate cover 12, at least partially covering the laminate cover 12. The base support 14 is formed from a non-hygroscopic material, meaning a material which tends not to absorb moisture. Accordingly, the laminate countertops 10 disclosed herein are suitable for installation in humid environments, such as coastal regions. Since the support 14 is formed from a non-hygroscopic material, the support 14 generally does not swell or deform when exposed to moisture and humidity. Accordingly, good adhesion between the support 14 and cover 12 is maintained throughout the useful life of the countertop 10. Also, the support 14 is lightweight compared to substrates formed from natural materials, such as stone or wood. Accordingly, countertops 10 including such substrates 14 are easier to install than countertops formed from heavy natural materials.

In some examples, the support 14 comprises a polymer substrate, core, or sheet, such as a polymer sheet formed from a synthetic polymer material. The synthetic polymer material can be polyvinyl chloride (PVC). The polymer sheet can be formed by extrusion using processes known in the art. The polymer sheet is sufficiently rigid to be worked or machined using conventional woodworking techniques and appliances. For example, the polymer sheet may be cut using a band saw or circular saw. Also, edges of the polymer sheet may be machined or formed using a router or similar cutting appliance to produce decorative curved edges and other designs.

In some examples, the polymer sheet comprises a close-cell foam, such as a closed cell foam having a density of about 0.25 g/cm$^3$ to about 1.0 g/cm$^3$, preferably about 0.60 g/cm$^3$. The closed-cell foam may have a tensile strength of less than about 20 MPa, preferably less than about 12 MPa. The polymer sheet can be about 12.5 mm to about 25 mm thick, preferably about 20 mm thick (about 0.5 inch to about 1.0 inch thick, preferably about 0.75 inch thick). In one example, the polymer sheet is a KOMATEX® free-foam PVC sheet produced by Kommerling USA, Inc. of Huntsville, Ala.

The invented laminate countertop is designed to resemble countertops formed from natural stone materials or synthetic solid surface materials. For example, the laminate countertops 10 disclosed herein can be formed with color and texture patterns that resemble natural stone. The countertops 10 can also include decorative edges extending around at least two adjacent sides of the countertop. As used herein, a laminate countertop material refers to a flexible polymer material formed as a sheet. The sheet can be formed from a combination of paper or textile materials encapsulated by and/or impregnated with a polymer resin material (e.g., melamine resin). The paper or textile sheet and polymer resin are cured to form a flexible sheet for use as a countertop. Desirably, such sheets are substantially non-porous to avoid staining and sufficiently impenetrable to water so that the surface can be cleaned by hand using, for example, a wet sponge. Formica® laminate sheets manufactured by the Dilller Corporation, of Cincinnati, Ohio are an example of a plastic sheet commonly used for laminate countertops. Laminate countertops are also available from WilsonArt and other sources.

The manufacturing process disclosed herein can easily be adapted for large scale commercial production. For example, a laminate cover 12 can be adhered to the base substrate or support 14 using a conveyor belt or roller assembly for guiding the support 14 and cover 12 through a laminating machine, such that the laminate cover 12 is adhered to the support 14 with a single pass through the machine. Decorative edges on latitudinal sides of the countertop 10 are added after the laminate cover 12 is adhered to the base support 14. Some or all of the manufacturing processes disclosed herein can also be automated to increase efficiency and/or to reduce costs.

The manufacturing processes disclosed herein are also selected so that imperfections, seams, and other inconsistencies are hidden from view to the extent possible. For example, an entire countertop section can be formed from a single sheet of laminate material so that the number of seams in the finished countertop arrangement is as small as possible. If seams are needed for a particular countertop arrangement, they should be positioned away from high traffic or commonly used areas of the countertop so that the seams will not be noticeable once the countertop is installed. Finally, the techniques disclosed herein are intended to produce a countertop 10 manufactured within tight tolerances and so that different portions of the countertop 10 align well with a minimum of gaps, overlaps, misalignments, and other inconsistencies, which would allow viewers to recognize that a countertop is manufactured from a laminate material and not from natural stone or synthetic solid materials.

Countertop Assembly

With reference to FIGS. 1A-3D, different examples of a four-sided laminate countertop 10 having a curved edge profile extending around at least two adjacent sides of the countertop 10 are illustrated. A curved edge profile, generally identified as edge profile 16, refers to a decorative edge profile that includes a combination of curved portions 18, grooves 20, and flat or angled surfaces 22. Specifically, FIGS. 1A, 2A, 3A, and 3B depict an exemplary countertop 10 with a curved edge profile comprising a flat substantially vertical surface extending between convex edges. FIGS. 1B, 2B, 3C, and 3D depict an exemplary countertop 10 with curved edges connected by a horizontal or slightly angled flat surface.

Traditionally, curved portions are carved into wood or stone materials. For example, a router can be used to carve a curved edge profile 16 onto a piece of wood. Similar carving machinery can be used for carving edge profiles for natural stone slabs. The curved edge profile 16 extends around sides of the countertop 10 such that curved portions on adjacent sides of the countertop 10 extend around corners of the countertop 10 to form continuous or substantially continuous grooves 20 extending around the completed countertop 10. In examples of a laminate countertop described herein, adjacent sides of the countertop 10 may be formed from different pieces of material (e.g., different pieces of the laminate sheet) joined together to form the countertop 10. For example, as shown in FIGS. 1A-3D, the separate pieces are aligned within acceptable tolerances such that the curved portion 18 or edge profile 16 appears to extend from one side of the countertop 10 to adjacent side(s) of the countertop 10.

Generally, the four-sided countertop 10 includes the base support 14 which includes a top surface 24, a bottom surface 26 (shown in FIGS. 3A-3D), opposing latitudinal sides 28, and opposing longitudinal sides 30. As discussed previously, the base support 14 is formed from the synthetic polymer sheet, such as a sheet of PVC. The base support 14 may comprise a single polymer sheet or multiple polymer sheets adhered together to form flat surfaces. The base support 14 may also include additional polymer sheets or pieces adhered to or extending from the longitudinal sides 30 of the base support 14 to form the decorative edges. In some examples, the base support 14 is about 40 inches to 60 inches wide and, preferably about 50 inches wide. The base support 14 can be any longitudinal length needed for a particular installation. Preformed countertops 10 can also be available at preselected lengths of, for example, 6 ft., 8 ft., 10 ft., 12 ft., or more.

Figure 4:
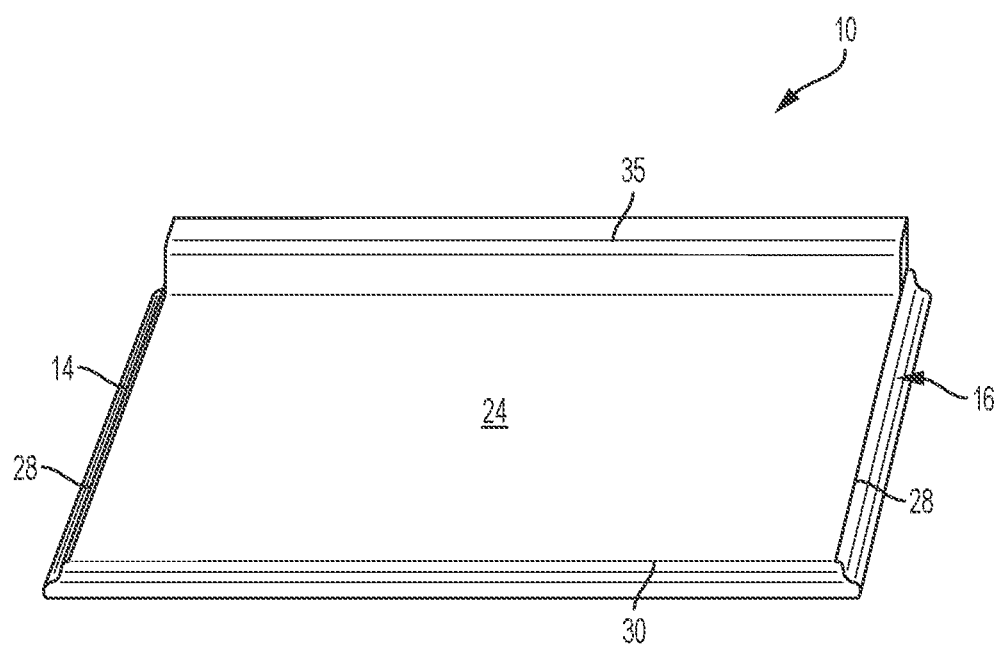
FIG. 4 is a perspective view of another embodiment of a countertop, according to an aspect of the disclosure.

At least one of the longitudinal sides 30 of the base support 14 includes or defines the curved edge profile 16. As discussed herein, in some examples, all four sides of the countertop 10 can have the curved edge profile 16, as would be used with a countertop for a kitchen island or bar top. In other examples, three sides of the countertop 10 can include the curve edge profile 16. The other side can be flat if, for example, the flat side is intended to be positioned against a wall. As shown in FIG. 4, in some examples, a countertop 10 includes a curved edge profile 16 extending around portions of three sides of the countertop 10. For example, the countertop 10 can include only one longitudinal side 30 having the curved edge profile 16. The countertop 10 can also include curved edge profiles 16 extending along portions of both latitudinal sides 28 of the countertop 10. A fourth side of the countertop 10 may be bent at a 90° angle relative to a top surface 24 of the countertop 10 to form a backsplash 35, as shown in FIG. 4. The backsplash 35 is configured to be positioned against a wall as is known in the art. In some examples, a top edge of the backsplash 35 can also have a curved edge profile 16. In some examples, the curved edge profile 16 of the backsplash 35 can be the same pattern as the other sides of the countertop 10. In other examples, the curved edge profile 16 on the backsplash 35 can be a different pattern.

With reference again to FIGS. 1A-3D, the countertop 10 also includes the laminate cover 12 formed from a cured resin material adhered to and covering at least a portion of the top surface 24 and at least a portion of the curved edge profile 16 of the base support 14. Laminate covers are generally formed from polymer resin materials, which may also include textile or paper layers. The laminate cover 12 is generally a flexible sheet having a thickness of 0.2 inch or less, and preferably about 0.05 inch or less. The laminate cover 12 can include a drawn, printed, or painted decorative pattern or design on an outer surface thereof. The pattern can be a stone pattern selected so that the countertop appears to resemble natural stone. The outer surface of the laminate cover 12 can also have a wood grain pattern or may be a solid color. Exemplary laminate materials which can be adhered to a base or substrate and used to form a countertop for a kitchen or bathroom are described, for example, in the following patents: U.S. Pat. Nos. 5,037,694; 6,096,410; 6,803,110; 8,313,824; and 7,754,120, each of which is incorporated by reference in its entirety.

The countertop 10 also includes at least one preformed straight edge member generally shown by number 32 having the curved edge profile 16 connected to at least one of the latitudinal sides 28 of the base support 14 to form the edge profile 16 extending around the at least two adjacent sides of the countertop 10. The preformed straight edge member 32 includes an edge support or plug 34 (shown in FIGS. 3A-3D) and a pre-stamped laminate cover 36 formed from the same or a similar material as the laminate cover 12. The preformed straight edge member 32 is adhered to the base support 14. For example, the pre-stamped laminate cover 36 may be the same design and/or color pattern as the laminate cover 12 on the base support 14. The design on the pre-stamped laminate cover 36 of the straight edge member 32 may also be positioned to line up with the laminate cover 12 on the base support 14 so that, for example, grain or stone layers appear to line up.

In some examples, the straight edge member 32 has a height H1 (shown in FIGS. 3B and 3D) of between 1.0 inch and 3.0 inches and a maximum width W1 (shown in FIGS. 3B and 3D) of between 1.0 inch and 2.0 inches. In some examples, as shown in FIG. 3B, a portion of the straight edge member 32, such as lower lip 40, is connected under the support 14. In that case, the straight edge member 32 extends beyond a periphery of the substrate by a distance W2 (shown in FIG. 3B), which is less than the total width W1 of the straight edge member 32. In such an embodiment, the width W2 can be less than 1 inch and, preferably, less than 0.5 inch. Further, in order to reduce visibility of seams in the finished countertop 10, it is desirable that the seam between the top of the laminate cover 12 on the support 14 and the laminate cover 36 of the straight edge member 32 is positioned on a curved or angled portion of the finished countertop 10. Seams extending between flat surfaces are more conspicuous than seams on curved surfaces. Therefore, as shown in FIGS. 3B and 3D, an outer surface of the laminate cover 36 is not co-planar with a surface of the laminate cover 12 of the support 14. For example, as shown schematically in FIGS. 3B and 3D, the outer surface of the laminate cover 36 of the straight edge member 32 curves away from a line L1, which represents the planar surface of the laminate cover 12. The outer surface of the laminate cover 36 is not co-extensive with line L1 along any portion of the outer surface of the laminate cover 36.

The plug 34 of the straight edge member 32 can be formed from the same non-hygroscopic material as the base support 14. For example, the plug 34 can be formed from an elongated member formed from a synthetic polymer material, such as PVC. The elongated member can be formed by an extrusion process, which forms an elongated member of a required length having a rectangular cross-section. The elongated member is sufficiently rigid to be worked or machined using conventional woodworking techniques and appliances. For example, edges of the plug 34 may be machined or formed using a router or similar cutting appliance to produce decorative curved edges and other designs.

In some examples, the plug 34 is about 40 inches to 60 inches in length, and preferably about 50 inches in length. The plug 34 can be about 1.0 to about 3.0 inches in height and depth. In some examples, the plug 34 has a substantially L-shaped or V-shaped cross section, as shown in FIG. 5. In other examples, a rectangular cross section may be used provided that such a shape can be easily mounted to the latitudinal side 28 of the base support 14.

As described in further detail herein, the size and shape of the plug 34 are selected to address problems caused by bowing or bending of the plug 34 as a result of a natural bias of the laminate material. In particular, the laminate cover 12 naturally biases to a rolled or curved position. As such, if the plug 34 were too thin or flexible, the straight edge member 32 including the plug 34 would bow causing the laminate cover 36 to pull away from the plug 34. Bowing would also make it more difficult to correctly attach the straight edge member 32 to the base support 14.

In some examples, the preformed straight edge member 32 includes weep holes 50 drilled through the top inwardly directed or rear surface 46 of the upper lip 38. The weep holes 50 are positioned to direct excess flowable adhesive, such as epoxy resin, away from a space between the pre-stamped laminate cover 36 and the plug 34 so that adhesive is evenly distributed on the plug 34. For example, pressing the plug 34 into the pre-stamped laminate cover 36 can cause flowable adhesive to flow into the weep holes 50 to remove excess adhesive. The straight edge member 32 can also include a longitudinally extending adhesive channel 62 sized to receive adhesive for mounting the straight edge member 32 to other portions of the countertop 10. Even though the plug 34 is formed from plastic (i.e., polyvinyl chloride closed cell foam), the channel 62 can be formed by any suitable woodworking technique including, for example, with a router, saw blade, power sanding device, or similar electronic device for forming grooves or channels in rigid plastics, wood, composite particle board, and similar materials.

The straight edge member 32 can also include brace holes 52 positioned on a bottom surface 54 of the lower lip 40 of the plug 34. The brace holes 52 can be drilled through the laminate cover 36. The brace holes 52 are spaced longitudinally along the straight edge member 32. As described herein, hook portions 112 of a brace 110 (shown in FIGS. 9A-9D) are inserted into the brace holes 52. Tightening the hooks 112 draws the brace 110 against the pre-stamped laminate cover 36 and plug 34 to allow adhesive for adhering the pre-stamped laminate cover 36 to the plug 34 to dry. As shown in FIGS. 9A-9D, the hooks 112 are substantially horizontal relative to the brace 110. In other examples, the hooks 112 can extend from the brace 110 at an angle of about 10°, 15°, or any angle relative to the horizontal.

Figure 3A:
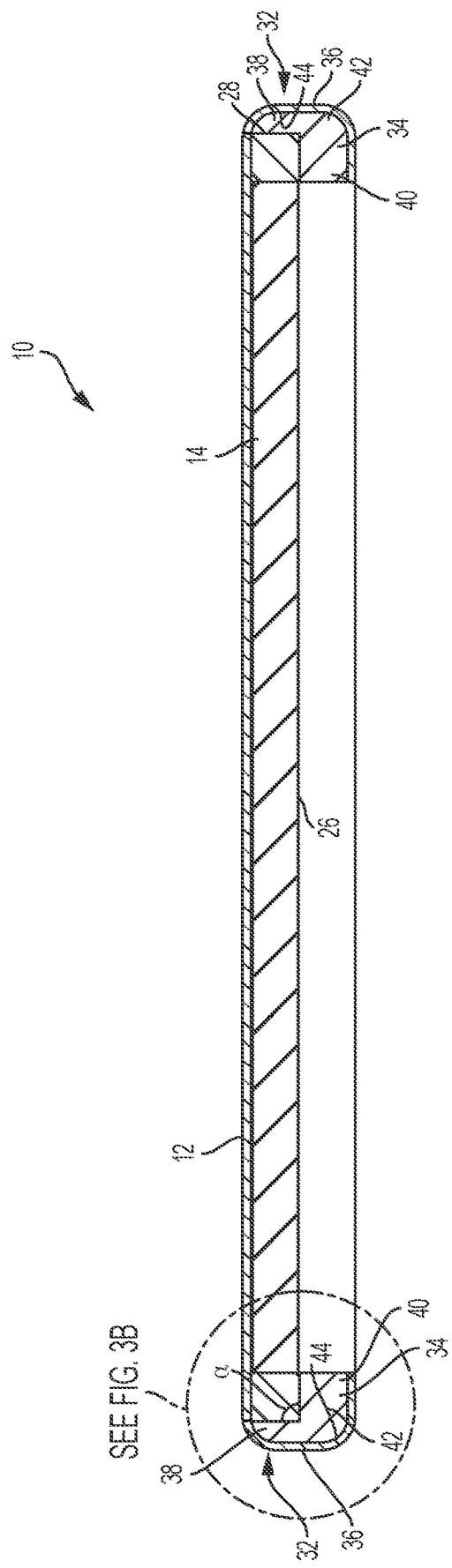
FIG. 3A is a cross-sectional view of the laminate countertop of FIG. 2A taken along line 3A-3A.
Figure 3B:
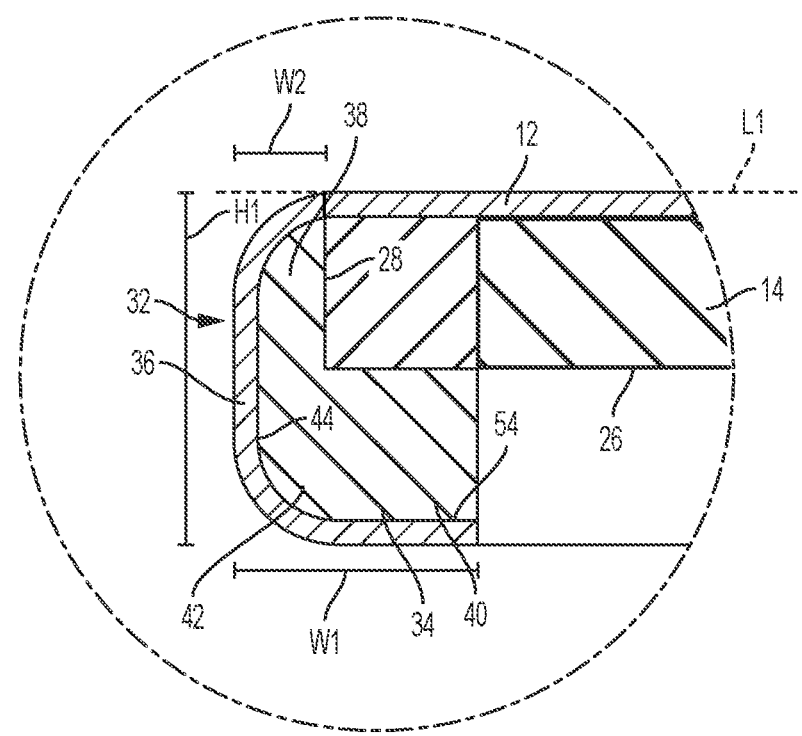
FIG. 3B is an enlarged cross-sectional view of a portion of the countertop of FIG. 3A.
Figure 5A:
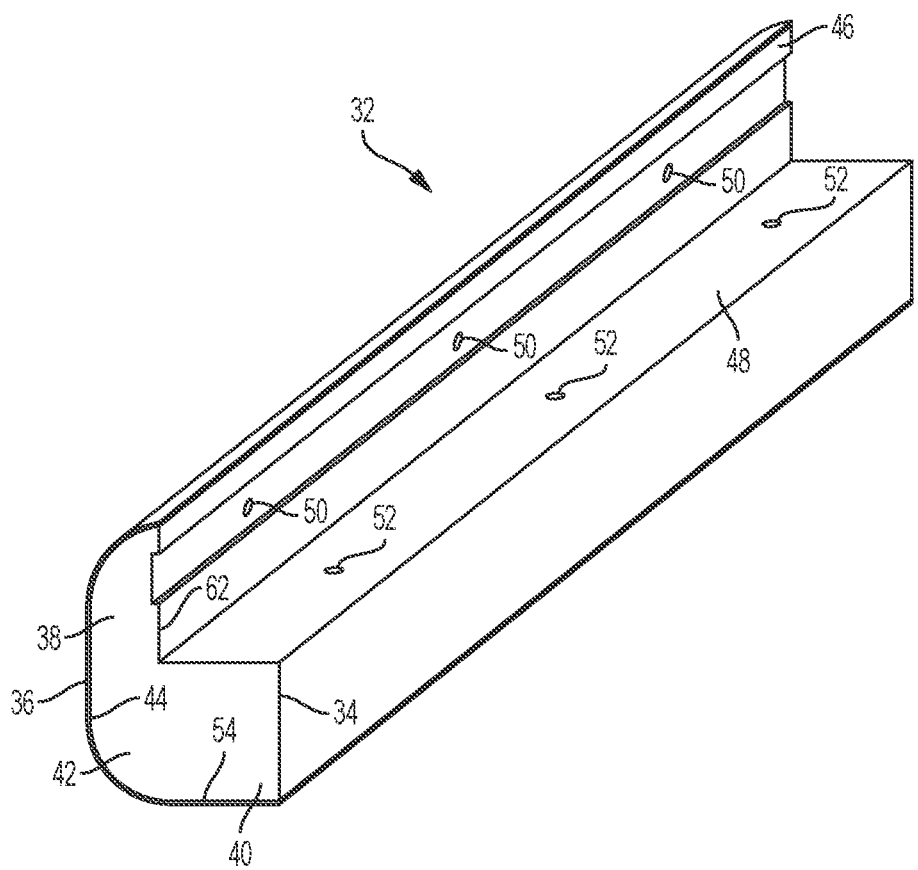
FIG. 5A is a perspective view of an edge member of the countertop of FIG. 1A, according to an aspect of the disclosure.

As shown in FIGS. 3A, 3B, and 5A, in some examples, the plug 34 can include the upper lip 38, the lower lip 40, and a central portion 42 extending between the upper lip 38 and the lower lip 40. An outer surface 44 of the upper lip 38 comprises the curved edge profile 16. The lips 38, 40 can be integrally formed with the central portion 42. In other examples, the lips 38, 40 are separate structures joined together by, for example, an adhesive and/or mechanical fasteners, such as screws, nails, or staples. In some examples, an angle α between an inwardly directed surface or rear surface 46 of the upper lip 38 and a top surface 48 of the lower lip 40 is between about 60° and 100° as shown by angle α in FIG. 5A. The lips 38, 40 of the plug 34 can be attached to a latitudinal side 28 and/or bottom surfaces 26 of the base support 14 to form a reliable connection between the base support 14 and the plug 34 of the preformed straight edge member 32. For example, the inwardly directed surface or rear surface 46 of the upper lip 38 of the plug 34 can be positioned to contact a substantially vertical surface of the latitudinal side 28 of the base support 14 and the top surface 48 of the lower lip 40 can be positioned to contact the bottom surface 26 of the base support 14 as shown in FIG. 3B.

Figure 3C:
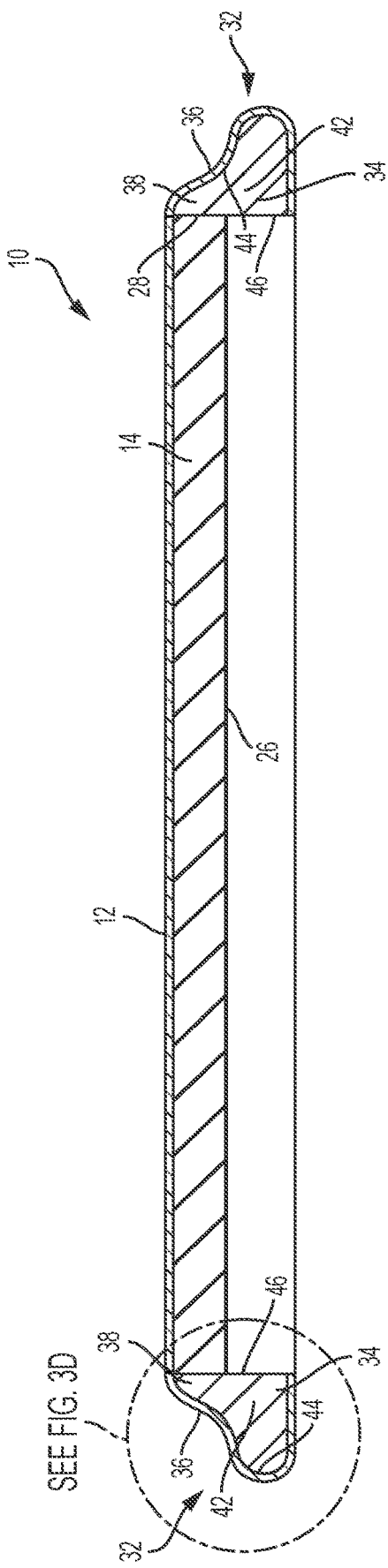
FIG. 3C is a cross-sectional view of the laminate countertop of FIG. 2B taken along line 3C-3C.
Figure 3D:
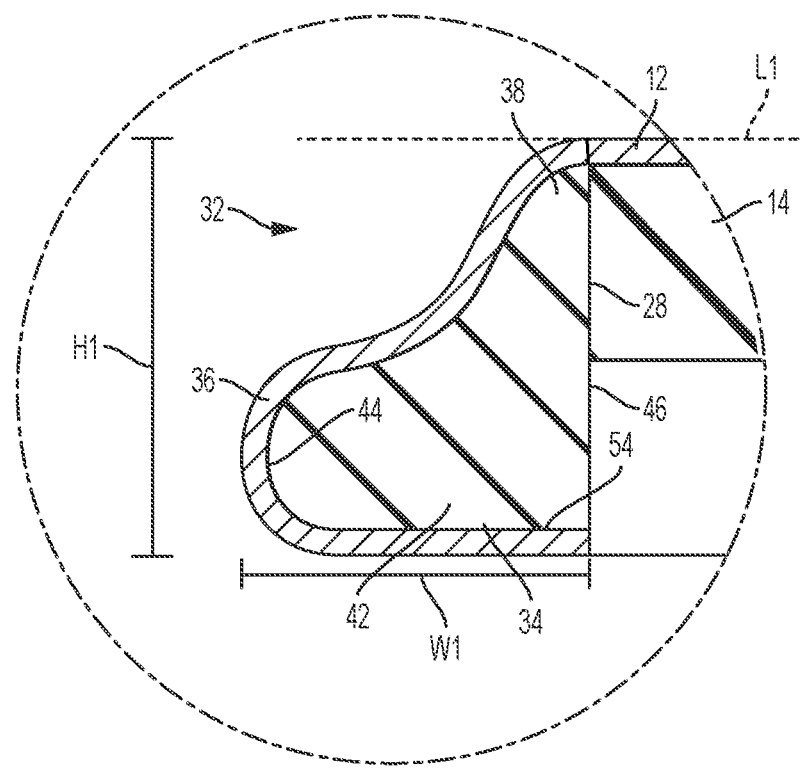
FIG. 3D is an enlarged cross-sectional view of a portion of the countertop of FIG. 3B.
Figure 5B:
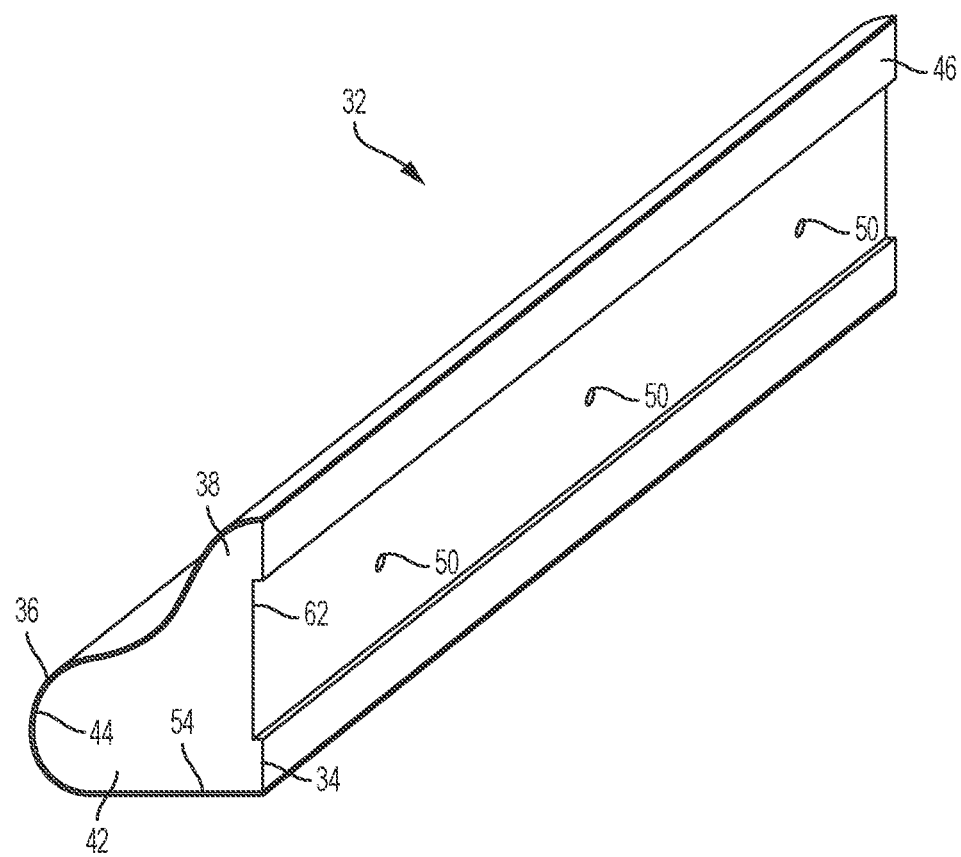
FIG. 5B is a perspective view of an edge member of the countertop of FIG. 1B, according to an aspect of the disclosure.

With reference to FIGS. 3C, 3D, and 5B, another exemplary arrangement of the plug 34 and laminate cover 36 is illustrated. In this example, the plug 34 includes only a central portion 42 and an upper lip 38, which form a substantially vertical inwardly directed or rear surface 46. The plug 34 defines a curved edge profile 16 including multiple curved portions connected together through an angled surface or groove. The plug 34 can be connected to the base support 14 in a similar manner to previously described examples. For example, the rear surface 46 can be mounted to the base support 14 using an adhesive or mechanical fastener as are known in the art.

Figure 6A:
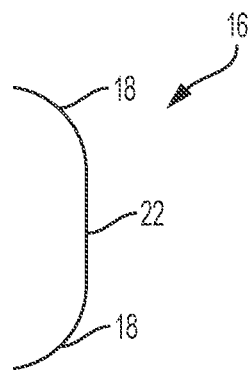
FIG. 6A is a schematic drawing of a curved edge profile, according to an aspect of the disclosure.

An exemplary curved edge profile 16 that can be used with a laminate countertop 10 of the present disclosure is shown in FIG. 6A. As previously described, the curved edge profile 16 is a decorative profile including the curved portions 18, one or more grooves 20, and flat or angled surfaces 22 selected to produce a visually appealing edge for use in kitchens, bathrooms, and similar uses. Further, the curved edge profile 16 should be easy to manufacture using commercial woodworking, laminating, and stamping machines. In some simpler examples, the curved edge profile 16 may be a single convex curve extending around the periphery of the base support 14. In other examples, the curved edge profile 16 can include combinations of curved portions 18, flat or angled surfaces 22, and grooves 20 extending around portions of the countertop 10 surface. The curved edge profile 16 of FIG. 6A is generally C-shaped having convexly curved portions 18 extending along a periphery of the curved edge profile 16. A substantially flat vertical surface 22 extends between the curved portions 18 forming the C-shape curved edge profile 16.

Figure 6B:
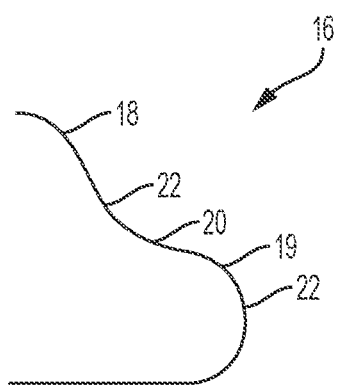
FIG. 6B is a schematic drawing of a curved edge profile, according to another aspect of the disclosure.

Another exemplary curved edge profile 16 that can be used with a laminate countertop 10 of the present disclosure is shown in FIG. 6B. As shown in FIG. 6B, the curved edge profile 16 includes a first convexly curved portion 18 configured to be adjacent to the top surface 24 of the countertop 10 and a second convexly curved portion 19 configured to be positioned adjacent to the bottom surface 26 of the countertop 10. The curved edge profile 16 also includes the angled surface 22 extending between the first and second curved portions 18, 19 of the curved edge profile 16. Other arrangements of curved portions 18, flat surfaces 22, and grooves 20 can also be used with the straight edge members 32 and countertops 10 of the present disclosure within the scope of the invention.

Manufacturing Processes

Figure 7:
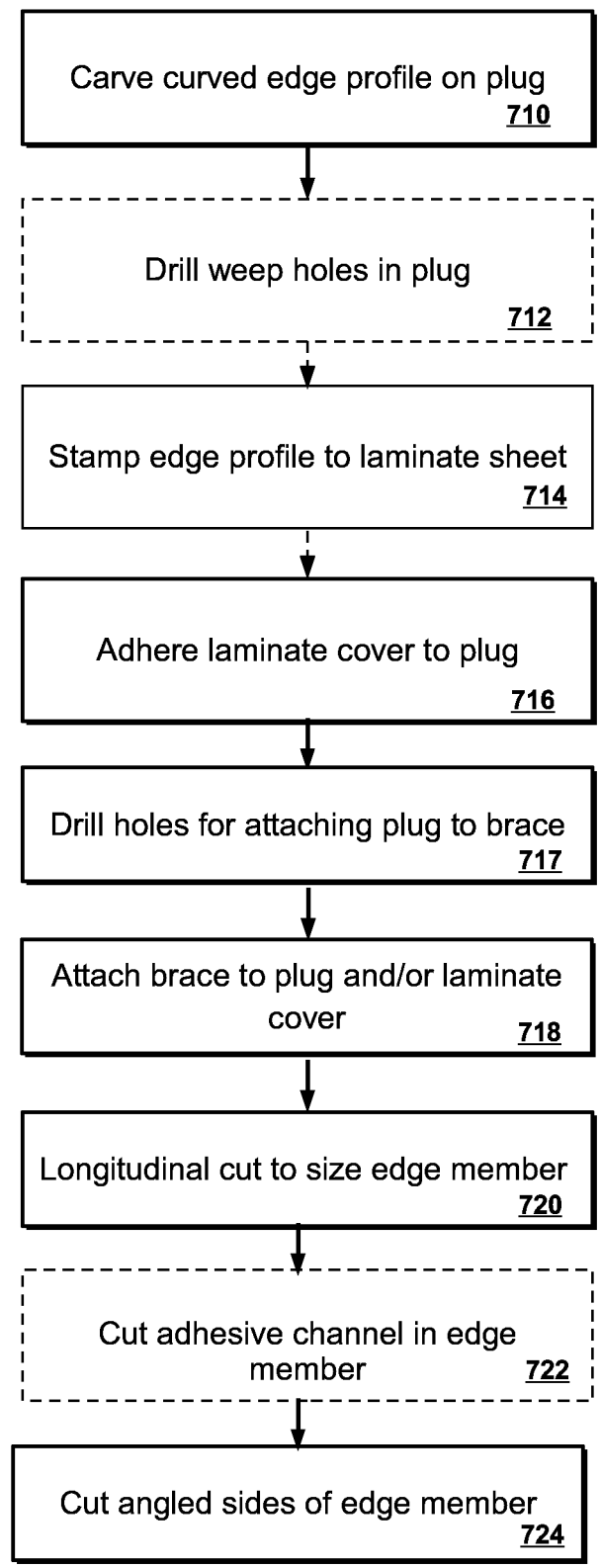
FIG. 7 is a flow chart showing steps for manufacture of an edge member, according to an aspect of the disclosure.
Figure 9A:
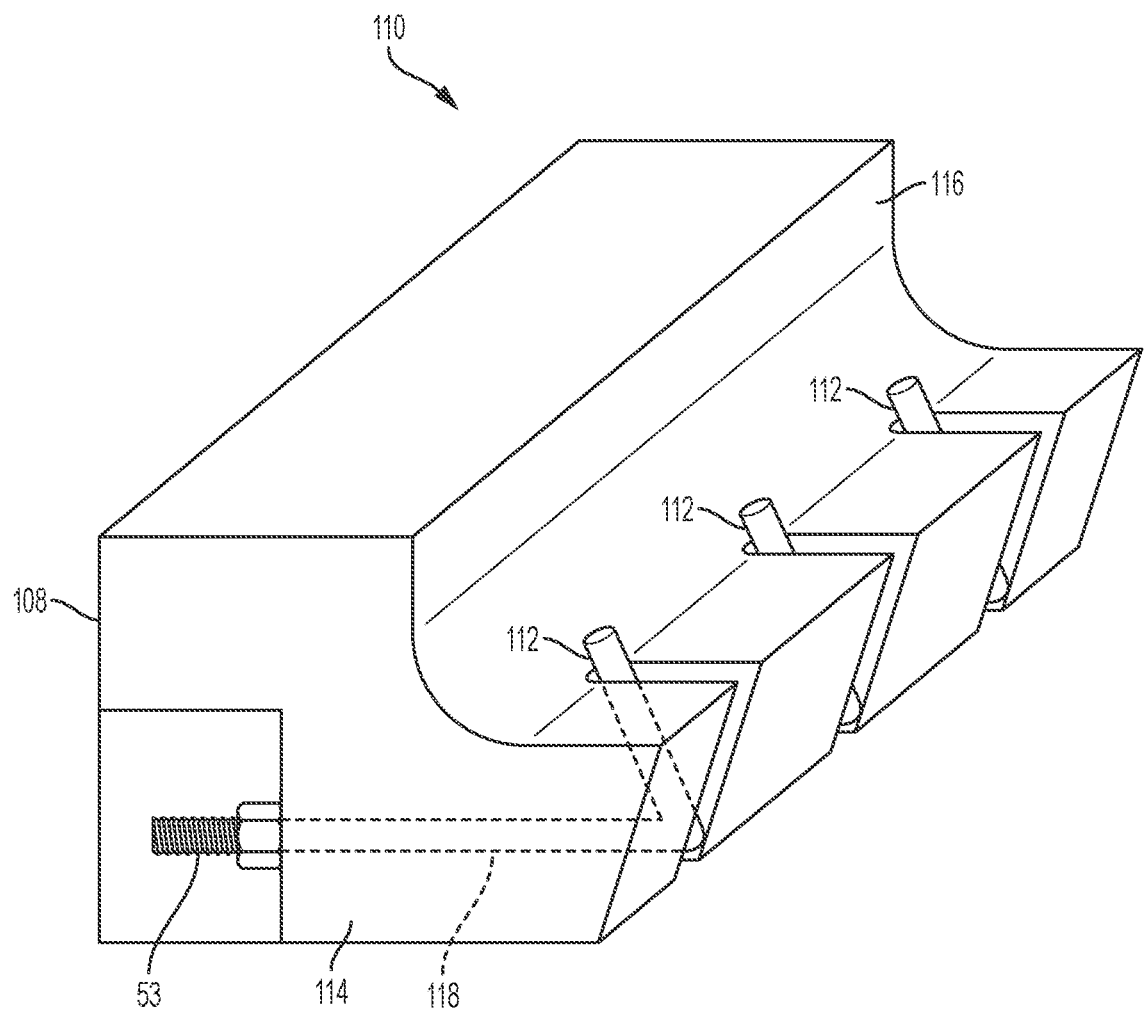
FIG. 9A is a perspective view of a brace for mounting a plug to a pre-stamped laminate cover for forming an edge member of the countertop of FIG. 1A, according to an aspect of the disclosure.
Figure 9B:
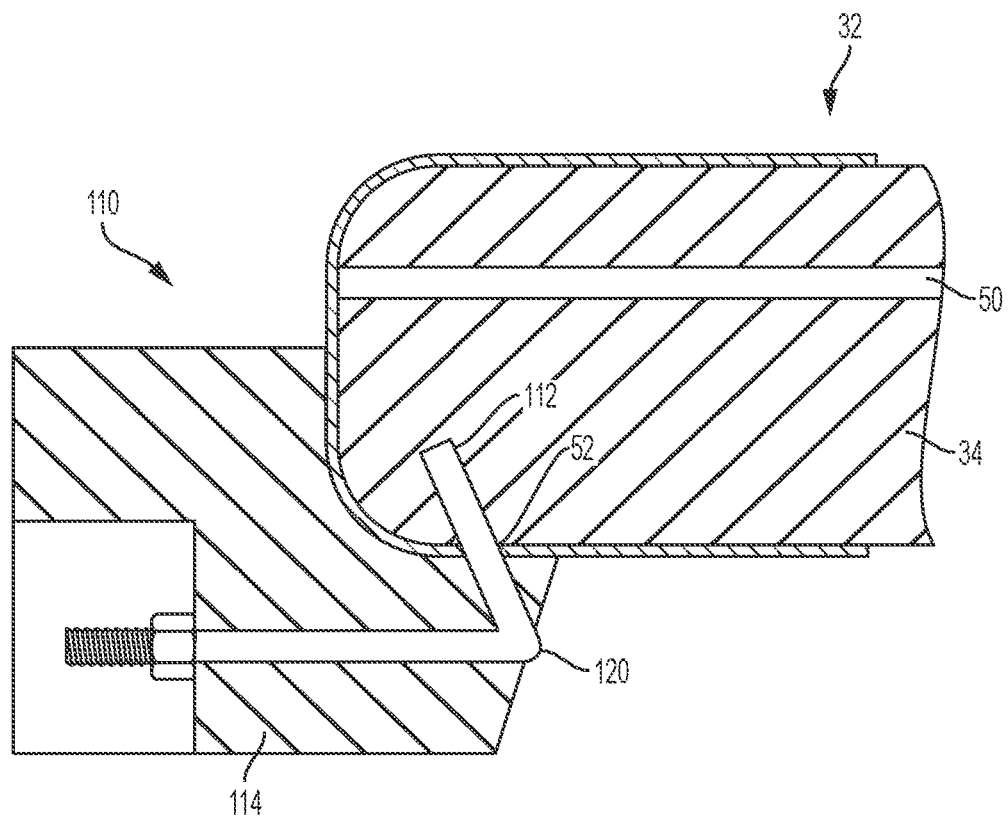
FIG. 9B is a schematic drawing of a cross-sectional view of the edge member and brace of FIG. 9A, according to an aspect of the disclosure.
Figure 9C:
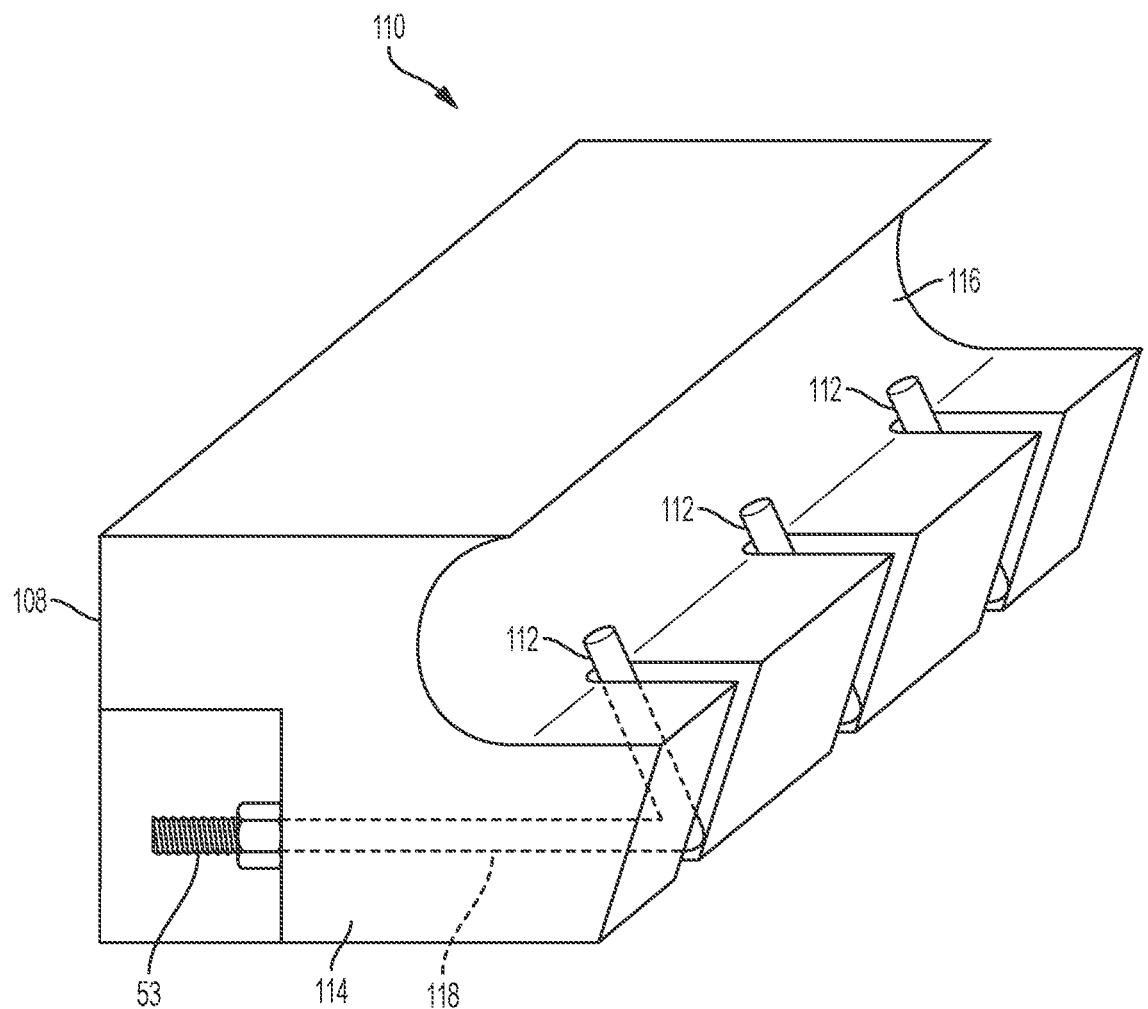
FIG. 9C is a perspective view of a brace for mounting a plug to a pre-stamped laminate cover for forming an edge member of the countertop of FIG. 1B, according to an aspect of the disclosure.
Figure 9D:
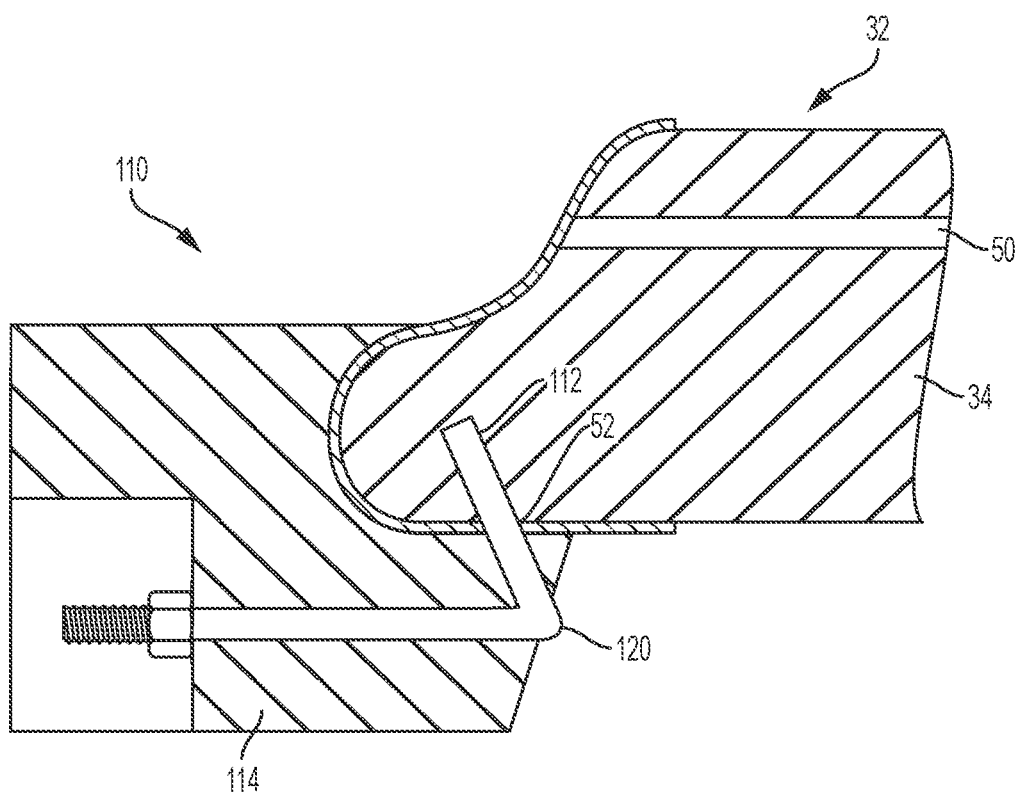
FIG. 9D is a schematic drawing of a cross-sectional view of the edge member and brace of FIG. 9C, according to an aspect of the disclosure.
Figure 10:
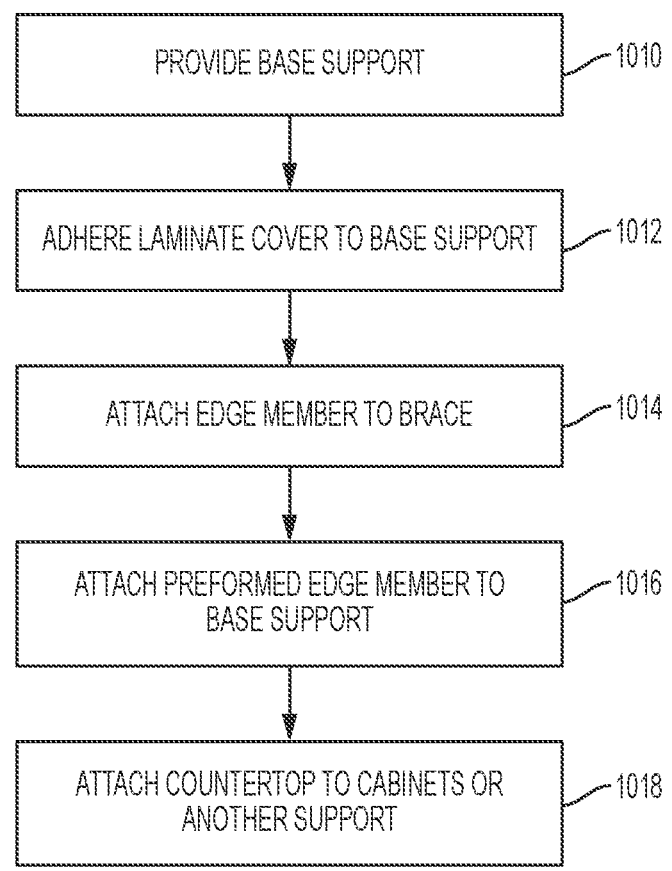
FIG. 10 is a flow chart showing steps for making a laminate countertop including an edge member, according to an aspect of the disclosure.

The straight edge member 32 and countertop 10 can be manufactured using a number of different processes. In some instances, aspects of manufacturing processes can be automated using laminating machinery, stamp presses, and table saws as are known in the art. In some instances, conveyer belt or roller systems can be used to automatically transport portions of the countertop from one machine to another. In other examples, aspects of the manufacturing process can be performed manually. For example, a user may manually apply adhesives or glue to different portions of the base support or laminate cover. A user may also manually assemble structures, such as the base support 14 or plug 34. Steps for forming the straight edge member 32 are shown in FIG. 7. Steps for forming a countertop 10 including one or more straight edge members 32 are shown in FIG. 10.

Edge Member Manufacturing Process

FIG. 7 illustrates a process for manufacturing the pre-formed straight edge member 32 comprising the plug 34 and laminate cover 36. As described herein, the straight edge member 32 can be attached to a base support 14 to form a laminate countertop 10 with a curved edge profile 16 extending around two or more adjacent sides 28, 30 thereof. As shown in FIG. 7, the method of forming the edge member 32 includes carving the curved edge profile 16 on a front side of the plug 34, as shown at 710. As previously described, the plug 34 is formed from the elongated member comprising the synthetic polymeric material, such as PVC. Also, as previously described, the plug 34 should be sufficiently strong to counteract a bias of the laminate cover 36 to prevent bowing.

In many cases, prior to being cut to include the curved edge profile 16, the plug 34 has a substantially square or rectangular cross-section. For example, the plug 34 can be about 1.0 to 3.0 inches in height and/or width. The plug 34 is intended to extend along a latitudinal side 28 of a countertop 10 and, as such, should have a length which substantially corresponds to the width of the completed countertop 10. For example, the plug 34 may be about 40 inches to 60 inches in width, and preferably about 50 inches in width.

In some examples, forming the plug 34 can also include a step 712 of drilling holes in the plug 34. For example, step 712 can include drilling weep holes 50 extending through the plug 34 for receiving excess glue or adhesive. Exemplary weep holes 50 are shown in FIG. 5.

The method also includes a step 714 of stamping a flexible laminate sheet by pressing a die having the curved edge profile 16 against the sheet to produce a laminate cover 36 having the curved edge profile 16. This stamping process, also referred to as pre-stamping, effectively imparts the curved edge profile 16 to the laminate cover 36. The laminate cover 36 can be formed from any suitable polymer and/or resin material. While the cover 36 can include many different colors, patterns, and textures, generally, the laminate cover 36 is formed from the same laminate material which covers the base support 14 of the countertop 10. In this way, the countertop 10 will appear to be formed from a single solid material, as is the case with natural stone and synthetic solid material countertops.

Stamping can be performed using a manually activated or automated stamping press as is known in the art. A conventional stamping press uses hydraulic cylinders, air cylinders, or mechanical force generating mechanisms to press the die against the sheet to impart the desired shape to the sheet. In some cases, the sheet can be heated prior to stamping to increase flexibility of the sheet. After stamping, the formed laminate cover can be permitted to cool so that the cover adopts the shape of the curved edge profile.

The method also includes a step 716 of adhering the laminate cover 36 to the curved edge profile 16 of the plug 34 using a curable adhesive, such as an epoxy resin. For example, as shown schematically in FIGS. 8A and 8B, the plug 34 can be inserted into the pre-stamped laminate cover 36 in a direction of arrow A1 such that the outer surface 44 of the plug 34 is pressed against an inner surface 36a of the laminate cover 36. In some examples, the plug 34 is initially longer than the stamped laminate cover 36 to make adhering the laminate cover 36 to the plug 34 easier. After the adhesive dries, the plug 34 and laminate cover 36 can be cut to the required final length needed for the countertop 10.

In order to adhere the cover 36 to the plug 34, the adhesive is placed on the outer surface 44 of the plug 34 and/or on the inner surface 36a of the laminate cover 36. In some cases, the adhesive can be applied manually. In other cases, automated machinery can be used for providing an appropriate amount of adhesive at a desired position on the plug 34 and/or laminate cover 36. As previously described, the plug 34 can include the weep holes 50 for conducting any excess adhesive away from the point of contact between the cover 36 and plug 34 to ensure good contact and adhesion between the cover 36 and plug 34. The plug 34 can also include the brace holes 52 for attaching the brace 110 to the plug 34.

The method also includes a step 717 of drilling one or more brace holes 52 for receiving a brace mechanism, clamp, or hook for holding the plug 34 while adhesive used for attaching the plug 34 to the laminate cover 36 is cured and/or dries. The brace holes 52 can be drilled through the laminate cover 36 and into the plug 34. Brace holes 52 for attaching the plug 34 to the brace 110 are shown in FIGS. 9A-9D.

The method further includes a step 718 of attaching the brace 110 to the plug 34 and laminate cover 36 to hold the laminate cover 36 against the plug 34 in a desired position. The brace 110 is provided to counteract the biasing force of the laminate cover 36 and to allow the adhesive to set so that the laminate cover 36 is strongly adhered to the plug 34. More specifically, as previously described, the flexible sheet used to form the laminate cover 36 will naturally return to a rolled or curved position absent sufficient support. Therefore, the laminate cover 36 can cause the plug 34 to bow or bend. The brace 110 is configured to counteract such bending by providing added support for the plug 34 as the adhesive sets. The brace 110 also provides a flat longitudinal surface, which can be used as a guide or jig when cutting grooves for attaching the straight edge member 32 to other portions of a laminate countertop 10.

As shown in FIGS. 9A-9D, in which a number of embodiments of the brace 110 are illustrated, the brace 110 is a longitudinally extending structure including a body portion 114 having a surface 116 shaped to receive the curved edge profile 16 of the laminate cover 36 and plug 34 and an opposing longitudinal flat surface 108, which can be used as a guide or jig when using a table saw to cut grooves or channels on portions of the straight edge member 32. For example, the flat longitudinal surface 108 of the brace 110 can be pressed against a table saw fence or similar structure for performing a longitudinal cut on the straight edge member 32, thereby producing an edge member 32 having an exact and easily reproducible thickness. The brace 110 also includes the one or more hooks 112 extending from the body portion 114 for drawing the plug 34 and laminate cover 36 against the surface 116 of the body portion 114. The hooks 112 can include a horizontal portion 118 and an angled or vertical portion 120. As discussed above, the horizontal portion 118 can be slightly angled relative to the horizontal. For example, the horizontal portion 118 can be elevated by about 10° or 15° relative to the horizontal. The angled or vertical portion 120 is configured to be inserted in the brace holes 52 extending from the bottom surface 54 of the lower lip 40 of the plug 34. Once the hooks 112 are inserted in the respective brace holes 52, the brace 110 can be tightened using a conventional technique (e.g., turning a nut and screw 53 to draw the plug 34 toward the brace body 114) to apply pressure to the laminate cover 36.

The brace body 114 and hooks 112 can be formed from any suitable material sufficient to provide support for the laminate cover 36 and plug 34. For example, the brace body 114 and/or hooks 112 can be a metal brace formed from aluminum or other light weight rigid metals. Various rigid plastic materials, such as high density polyethylene, polystyrene, or polycarbonates, may also be used for portions of the brace 110.

With continued reference to FIG. 7, the method can also include a step 720 of cutting the straight edge member 32 to a desired thickness. The step is performed while the brace 110 is still connected to the plug 34 to provide support for the plug 34. As discussed herein, the flat longitudinal surface 108 of the brace 110 also assists in positioning the plug 34 for making the cut(s). In particular, the flat longitudinal surface 108 of the brace 110 positions the plug 34 a defined distance from a saw blade so that a straight edge member 32 of exact and consistent thickness is easily produced. In some examples, the cut is performed with a single blade to produce a straight edge member 32 with a substantially flat rear surface 46, as shown in FIGS. 3C and 3D.

In other examples, the cutting step can produce a plug 34 having an upper lip 38, a lower lip 40, and a central portion 42 extending between the upper and lower lips 38, 40. As shown in FIG. 5A, in some examples, the angle α between the inwardly directed or rear surface 46 and a top surface 48 of the lower lip 40 is about 90°. In other examples, the angle may be acute (e.g., between about 60° and 90°), as would be useful if an angle or slope defined by the curved edge profile 16 is also acute. In other examples, the groove angle α is slightly obtuse (e.g., between about 90° and 100°). The sides or surfaces of the groove can be about 0.5 inch to 2.5 inches in length.

The groove can be cut using suitable cutting techniques and machinery, as is known in the art. For example, a table saw including one or more rotating blades can be used for cutting one or more grooves on the plug 34. In some cases, the saw blade can be angled to cut a groove in a single pass. In another example, two rotating saw blades can be used. In that case, cutting the groove can include cutting a first cut with a first rotating saw blade followed by cutting a second cut with a second rotating saw blade to form the groove. For example, the first cut can be a substantially vertical or slightly angled cut extending from a top portion of the plug 34. The second cut can be a horizontal cut extending from the rear side of the plug 34.

The method can further include a step 722 of forming a channel (such as the adhesive channel 62 shown in FIGS. 5A and 5B) for receiving adhesives on a rear surface 46 of the straight edge member 32. For example, the channel 62 may be cut or carved on the rear surface 46 of the plug 34 using a router as is known in the art.

The method can further include a step 724 of cutting angled edges or sides on each end of the straight edge member 32 so that the straight edge member 32 can be attached to a countertop 10 to form corners. For example, while the brace 110 is still edged to the straight edge member 32, the angled edges or sides can be cut at a 45 degree angle and can be configured to be in face-to-face contact with corresponding angled surfaces of the base support 14 to form a suitable corner which appears to include a continuous edge profile extending around the corner. In other examples, the angled edges can be cut at other angles, such as 30° or 60°. In this way, the curved edge profile 16 can be configured to extend around irregular shaped corners.

Countertop Manufacturing Process

With reference to FIG. 10, a method for forming a laminate countertop 10 including straight edge members 32 on one or more latitudinal edges or sides 28 thereof is illustrated. The method of forming the countertop 10 includes a step 1010 of providing a base support 14 having a top surface 24, a bottom surface 26, opposing latitudinal sides 28, and opposing longitudinal sides 30, wherein at least one of the longitudinal sides 30 comprises a curved edge profile 16. For example, as previously described, the base support 14 can be formed from a synthetic polymer material, such as a PVC sheet. The base support 14 can be formed from a single polymer sheet. In other examples, the base support 14 can include additional polymer sheets or pieces attached to sides of a larger polymer sheet or body to form longitudinal sides 30 having the curved edge profile 16. As previously described, the curved edge profile 16 can be a decorative edge profile having one or more convexly curved portions. The base support 14 is generally between about 40 inches and 60 inches in width. The length of the provided base support 14 is determined based on size of the installation. In some examples, countertop segments are available in pre-sized lengths of 6 feet, 8 feet, 10 feet, 12 feet, or more. Countertops 10 can be cut to a desired length prior to installation.

The method also includes a step 1012 of adhering a laminate sheet to the base support 14 to form a laminate cover 12 over at least a portion of the top surface 24 and a portion of the curved edge profile 16 of the base support 14. As previously discussed, the laminate cover 12 can be a flexible polymer and/or resin sheet. The cover 12 can also include textile or fabric portions enclosed by cured resin. The laminate cover 12 can include a color pattern, texture, and design selected to resemble other popular counter materials, such as natural stone.

In some examples, adhering the laminate cover 12 to the base support 14 can include applying an adhesive, such as epoxy resin, to the surface of the base support 14 and then pressing the laminate sheet against the base support 14. The adhesive can be epoxy resin or other synthetic polymeric glues or curable materials capable of adhering a laminate sheet formed from plastic or resin to the base support 14. In some examples, the step 1012 of adhering the laminate cover 12 to the base support 14 is performed using a laminating machine, as is known in the art. A laminating machine applies heat and pressure to the laminate sheet to activate and cure the adhesive.

In some examples, adhering the laminate cover 12 to the base support 14 involves adhering portions of the laminate cover 12 over the curved edge profile 16 on the longitudinal side(s) 30 of the base support 14. In this way, a longitudinal side 30 with the curved edge profile 16 is formed.

The method also includes a step 1014 of mounting a preformed straight edge member 32 to a brace, such as brace 110 shown in FIGS. 9A-9D. The brace 110 provides support for a formed straight edge member 32 and, in particular, removes any bowing or bending of the straight edge member 32 so that the straight edge member 32 can be properly aligned to the base support 14.

In some examples, the straight edge member 32 used for forming a countertop 10 is a straight edge member 32 formed according to the method shown in FIG. 7. In that case, the brace 110 can be attached to the straight edge member 32 during a step of adhering the laminate cover 36 to the plug 34. However, straight edge members 32 formed using other methods can also be used, provided that the straight edge member 32 is a correct size and shape to be attached to the base support 14. For example, a straight edge member 32 manufactured with a bowed orientation can be mounted to the brace 110 to remove the curvature. Once the curvature is removed, the straight edge member 32 can be mounted to the laminate countertop 10, as discussed herein.

As shown at step 1016, the straight edge member 32, which is mounted to the brace 110, can be attached to the base support 14 to form a laminate countertop 10. Once the straight edge member 32 is securely mounted to the base support 14, the brace 110 can be removed. When connected together in this manner, a curved edge profile 16 extending around at least two adjacent sides of the countertop 10 is formed. Further, the straight edge member 32 should be sufficiently rigid to prevent bowing so that the top and sides of the straight edge member 32 line up with corresponding top and sides of the base support 14. The straight edge member 32 should include a curved edge profile 16 that matches the curved edge profile 16 of the longitudinal side(s) 30 of the base support 14. As previously described, the straight edge member 32 includes the plug 34 and laminate cover 36 extending over the curved edge profile 16 of the plug 34. The laminate cover 36 can be formed from a material having a similar appearance (e.g., same color and texture) as the laminate sheet adhered to the base support 14. As such, the completed countertop 10 appears to be formed from a carved stone slab or from a solid synthetic material rather than from a laminate material.

Figure 11:
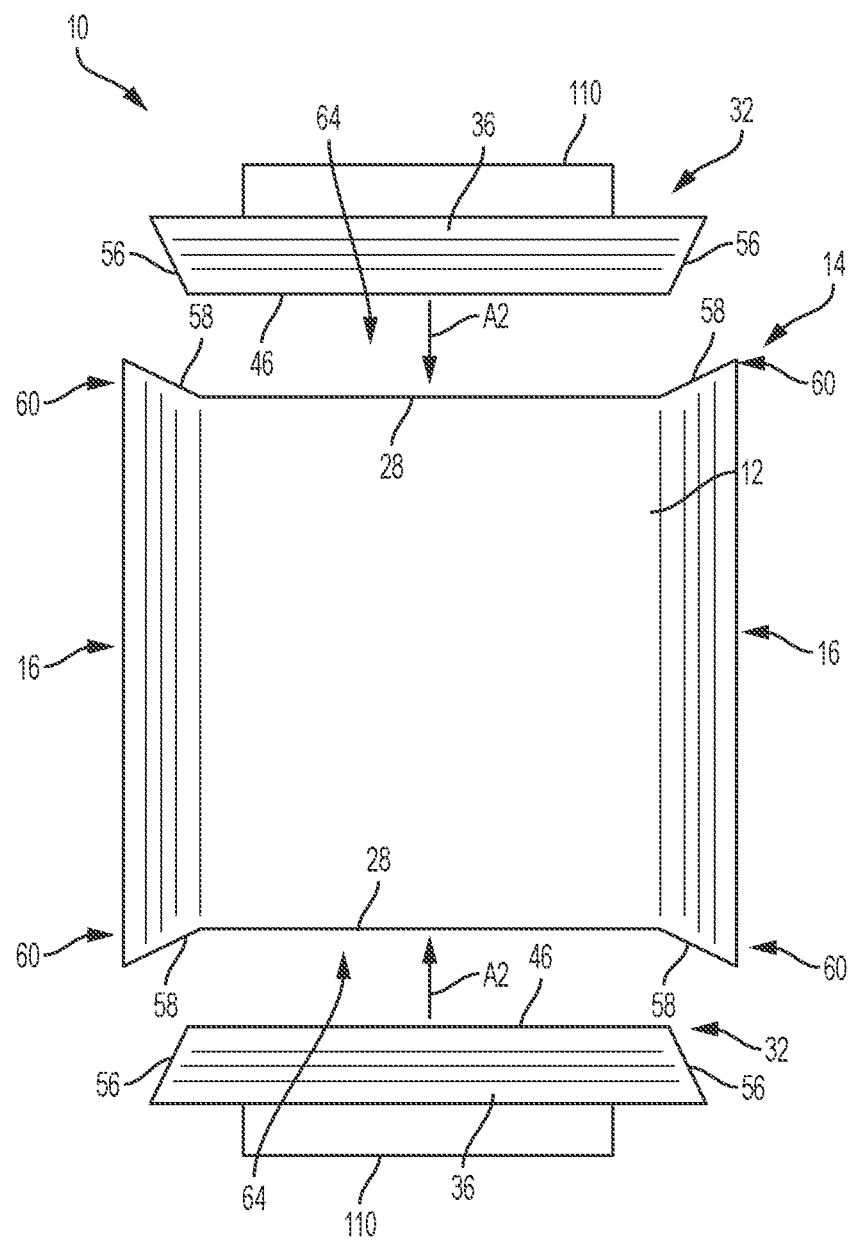
FIG. 11 is a schematic drawing of a top view of edge members being connected to a base support to form a laminate countertop, according to an aspect of the disclosure.

A schematic drawing showing how a straight edge member 32 mounted to a brace 110 is attached to the base support 14 to form a countertop 10 is shown in FIG. 11. As shown in FIG. 11, in some examples, the base support 14 is formed with angled corner edges 58 sized to receive angled sides 56 of the straight edge member 32 to form a corner, generally shown by number 60, of the countertop 10. For example, the sides 56 can be angled at about 45°. As shown by arrow A2, the straight edge member 32 is inserted into a space 64 between the corner edges 58 of the base support 14, such that the inwardly directed or rear surface 46 of an upper lip 38 of the plug 34 is in face-to-face contact with a latitudinal side 28 of the base support 14. Further, a top surface 48 of the lower lip portion 40 of the plug 34 is brought into face-to-face contact with the bottom surface 26 of the base support 14. The straight edge member 32 can be attached to the base support 14 using a combination of curable adhesives and mechanical fasteners. For example, wood glue can be applied to the corresponding surfaces 36, 48 of the straight edge member 32 and base support 14 to form a secured connection between the straight edge member 32 and base support 14. Mechanical fasteners, such as nails or screws, can be inserted between the base support 14 and straight edge member 32 to provide additional strength. For example, screws can be inserted through the lower lip 40 of the straight edge member 32 and into the bottom surface 26 of the base support 14.

As previously described, a straight edge member 32 can be attached to both latitudinal sides 28 of the base support 14 to form a countertop 10 having a curved edge profile 16 extending around all four sides of the countertop 10. A countertop 10 with four curved sides would be used for kitchen islands and similar structures in which all sides of the countertop 10 are visible. In other examples, a straight edge member 32 may only be attached to one of the latitudinal sides 28 of the base support 14 if, for example, the other side is intended to be positioned against a wall, appliance, or is not easily seen for some other reasons.

As shown at step 1018, the completed countertop 10 can be mounted to cabinetry or another type of support (e.g., a table, bar, or counter) to form a completed structure. In many cases, the countertop 10 is attached to the cabinetry or support structure at the installation location. For example, a contractor may mount the countertop 10 to installed cabinets. In other examples, the countertop 10 can be mounted to a piece of modular furniture prior to installation of the furniture. The modular furniture can be available in predetermined sizes. The modular furniture can be transported to an installation location and installed with the laminate countertop 10 already in place.

Laminate Countertop with Angled Corners

The aesthetic appearance of the laminate countertops 210 disclosed herein can be further enhanced by modifying the regular or square corners shown in the previous embodiments to be irregular or angled corners 206. Examples of countertops 210 including angled corners 206 are shown in FIGS. 12-17. As used herein, irregular or angled corners 206 refer to corners having one or more angled edges, segments, or sections extending between a longitudinal side 230 and a latitudinal side 228 of the countertop 210. In contrast, in a square corner, as in previously discussed countertop examples, the latitudinal edge or side of the countertop meets the longitudinal side without any angled edges, segments, or sections extending between the latitudinal edge or side and the longitudinal side. As will be appreciated by those skilled in the art, a substantially square corner forms an angle of about 90°. As used herein, a "substantially square corner" can refer to a corner that is from 85° to 95°.

Figure 13A:
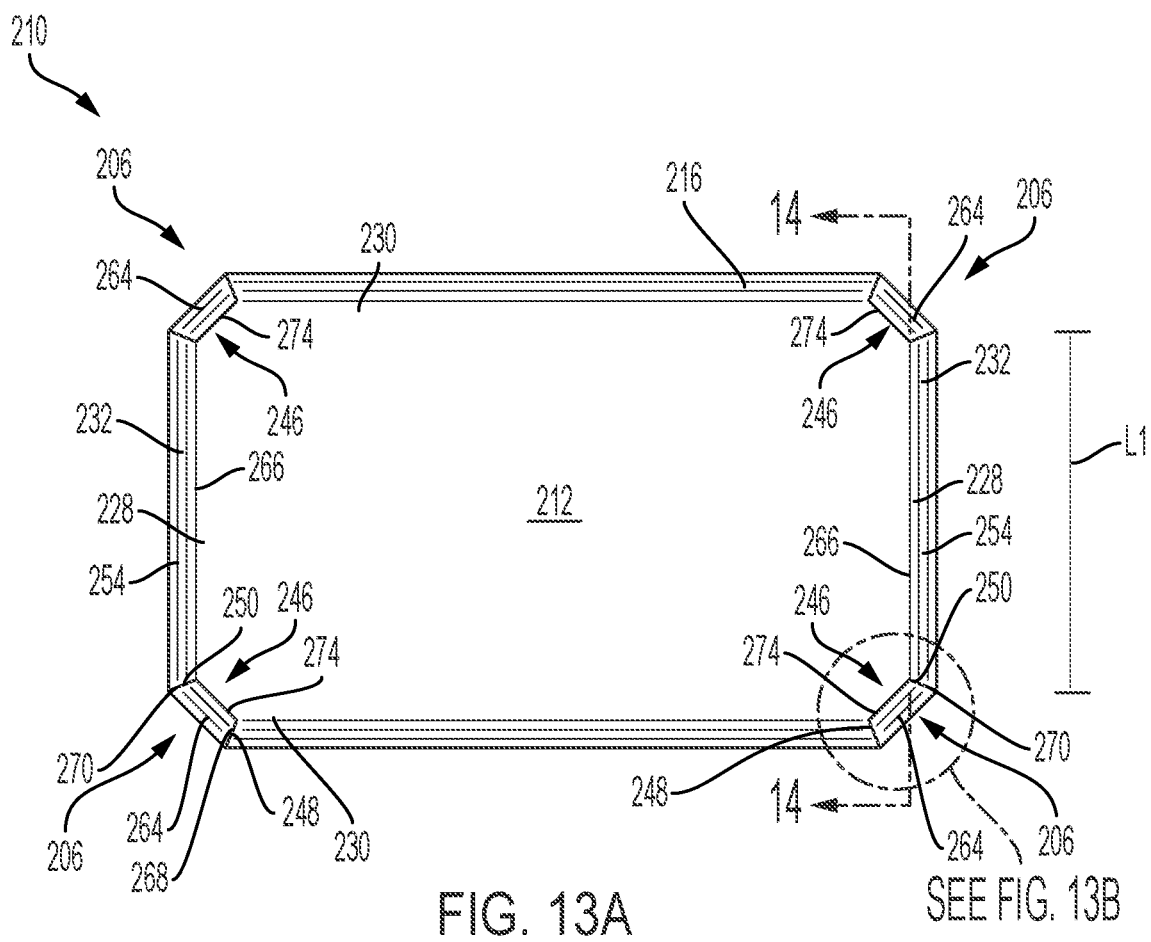
FIG. 13A is a top view of the countertop of FIG. 12.

In some examples, the angled corners 206 include a single angled segment, edge, or surface positioned at about a 45° angle relative to the latitudinal and longitudinal sides of the countertop 210, as shown by the dashed lines in FIG. 13A. In other examples, the angled corner 206 can include multiple segments, edges, or surfaces extending between the latitudinal side 228 and the longitudinal side 230. For example, an angled corner 306 of a countertop 310 could include three angled segments, each positioned at about a 30° angle relative to the sides of the countertop 310 as shown, for example, in FIGS. 18 and 19.

Angled or irregular corners 206 can be more aesthetically pleasing than square corners, especially for countertops 210 which overhang a support structure, such as cabinetry or table legs, by a substantial distance (e.g., by about 4 to 8 inches or more). Further, irregular or angled corners 206 can give a laminate countertop 210 a more customized appearance making the laminate installation more closely resemble more expensive customized natural stone countertops. In particular, the appearance of kitchen islands, bar tops, desks, dining tables, and similar structures can be enhanced by including angled corners either instead of or in combination with square corners for a laminate countertop.

Countertops formed from natural stone including angled corners have been available for many years. As described previously, natural stone countertops are cut using computer controlled cutting machinery, meaning that a wide variety of edge designs can be generated. However, conventional laminate countertops are generally manufactured and sold with square corners. Further, even if a laminate countertop were cut during installation to include angled corners, there would not be a curved edge profile extending around the angled corner. The lack of a continuous curved edge profile would be a clear indication that the countertop was laminate and not formed from natural stone. The present disclosure addresses such deficiencies and provides various manufacturing methods for forming laminate countertops including angled corners having curved edge profiles.

Figure 17:
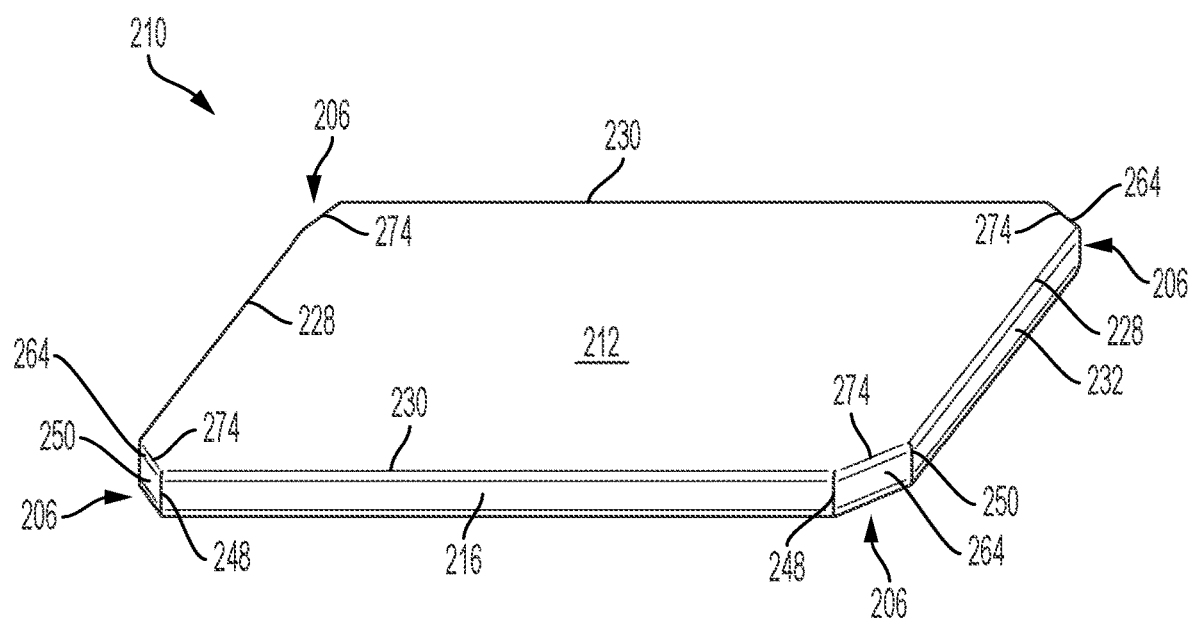
FIG. 17 is a perspective view of another example of a laminate countertop including angled corners, according to an aspect of the disclosure.

FIGS. 12-17 show exemplary laminate countertops 210 including angled corners 206 including a curved edge profile 216 extending around the angled corners 206. The curved edge profile 216 shown in FIGS. 12-16 comprises curved edges 218 connected by a horizontal or slightly angled flat surface 222, which is similar to curved edge profiles shown in FIGS. 1B, 2B, 3C, and 3D. Countertops 210 with angled corners 206 including other profile designs can be created within the scope of the present disclosure. For example, as shown in FIG. 17, the angled corners 206 may also include profile designs, such as the curved edge profile comprising a flat substantially vertical surface extending between convex edges shown in FIGS. 1A, 2A, 3A, and 3B.

The curved edge profile 216 extends across the segments or edges of the angled corner 206, such that the countertop 210 appears to have a continuous curved edge extending from the longitudinal side 230 to the latitudinal side 228 of the countertop 210 through the segments or edges of the angled corner 206. The countertop 210 can also include one or more square corners 208 (shown in FIG. 16). The curved edge profile 216 can also extend around the square corners 208, which can be produced according to the manufacturing methods described previously.

With specific reference to FIGS. 12-16, as in previous examples, the laminate countertop 210 includes a base support 214. As in previous examples, the base support 214 comprises a synthetic polymer material, such as a PVC sheet. The PVC sheet can comprise a closed-cell foam. The base support 214 can be configured to be securely and easily mounted to a support structure or framework, such as standard manufactured or custom cabinetry (not shown). As in previous examples, the base support 214 can be about 0.5 inch to 2.0 inches thick, preferably about 0.75 inch thick. The base support 214 is about 40 inches to 60 inches wide and, preferably about 50 inches wide. The base support 214 can be any longitudinal length needed for a particular installation. Preformed countertops 210 can also be available at preselected lengths of, for example, 6 ft., 8 ft., 10 ft., 12 ft., or more.

As in previous examples, the base support 214 includes a top surface 224, a bottom surface 226, the opposing latitudinal sides 228, and the opposing latitudinal sides 230. As used herein, longitudinal sides 230 refer to the opposing longer sides of a rectangular countertop. The latitudinal sides 228 refer to the opposing shorter sides of the countertop of a rectangular countertop.

At least one of the longitudinal sides 230 includes the curved edge profile 216. The countertop 210 further includes a laminate cover 212 formed from a cured resin material adhered to and covering at least a portion of the top surface 224 and at least a portion of the curved edge profile 216 of the base support 214. As in previous examples, the cured resin material can be a polymer sheet decorated to resemble, for example, natural stone. The laminate cover 212 is adhered to the top surface 224 and to the curved edge profile 216 on the longitudinal edge 230 of the base support 214 with a conventional adhesive, such as epoxy resin or other synthetic polymeric glues or curable materials capable of adhering to a laminate sheet formed from plastic or resin to the base support 214.

The base support 214 of the countertop 210 also includes at least one cutout section 246 at the angled corner 206 of the base support 214 between one of the longitudinal sides 230 and one of the latitudinal sides 228 thereof. The cutout section 246 can be formed from opposing angled sides, such as a first angled side 248 and a second angled side 250, and a connecting cut or side 252 extending between the angled sides 248, 250. The angled sides shown in FIGS. 12-16 are cut to about 45° relative to the longitudinal side 230 and the latitudinal side 228 of the countertop 210, which produces an angled edge of 45°. However, as discussed previously, the angled corners 206 could be cut to other angles within the scope of the present disclosure to produce angled corners 206 of different lengths and angles.

The laminate countertop 210 also includes edge members, such as the straight edge member 232 and an angled edge member 264, with the curved edge profiles 216. As in previously described examples, the edge members 232, 264 are generally "preformed edge members" formed by inserting a plug into a stamped or molded laminate cover. As discussed previously, the plug can be formed from the elongated member comprising the synthetic polymer material. The elongated member is machined or worked to a desired shape and edge profile. For example, the plug can comprise the closed-cell PVC foam discussed previously. The edge members 232, 264 are mounted to sides 228, 230 and cutout section 246 of the base support 214 to form the angled corners 206. For example, the countertop 210 can include at least one of the straight edge members 232 mounted or adhered to the latitudinal side 228 of the base support 214. The straight edge member 232 can have a length L1 corresponding to a length of the latitudinal side 228 of the base support 214. The length L1 of the straight preformed edge member 232 can be, for example, 40 inches, 60 inches, or 80 inches.

Figure 12:
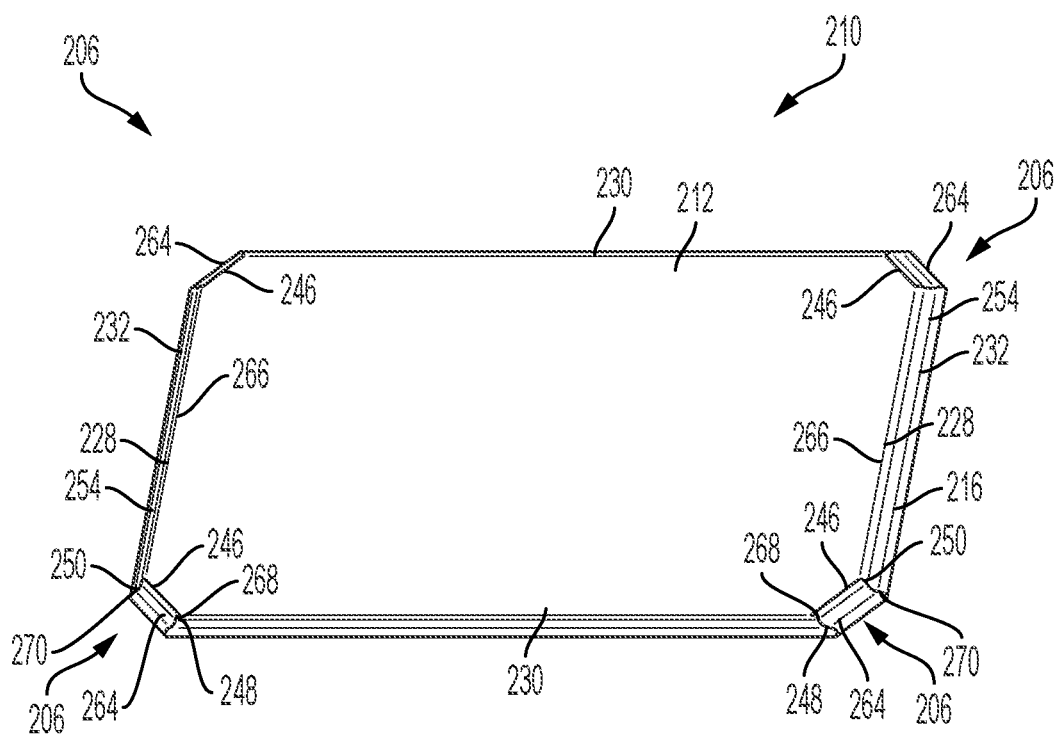
FIG. 12 is a perspective view of a laminate countertop including angled corners, according to an aspect of the disclosure.
Figure 13B:
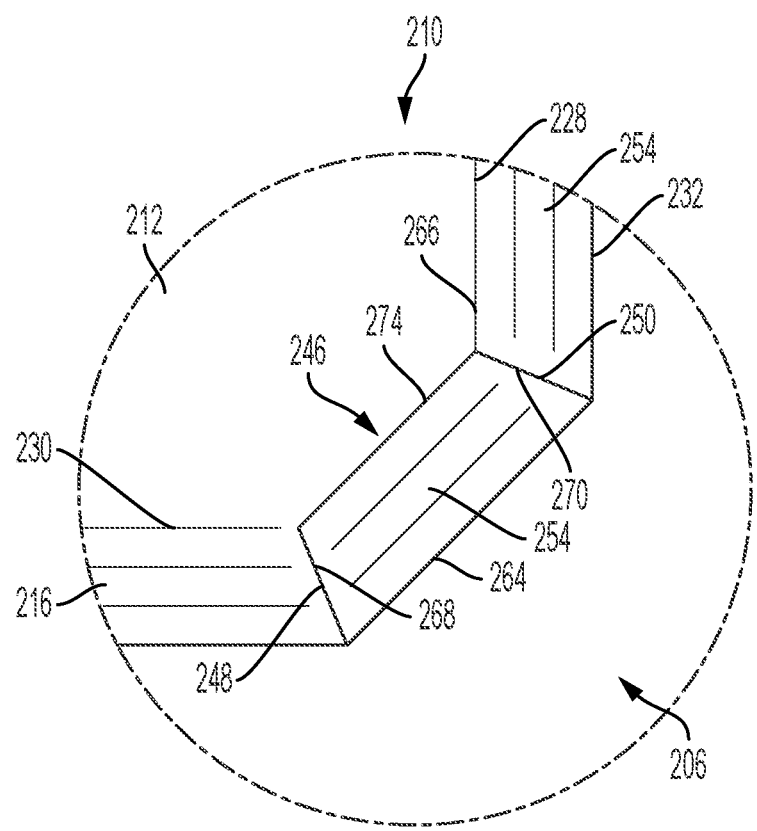
FIG. 13B is an enlarged top view of the countertop of FIG. 12 showing one of the angled corners.
Figure 14:
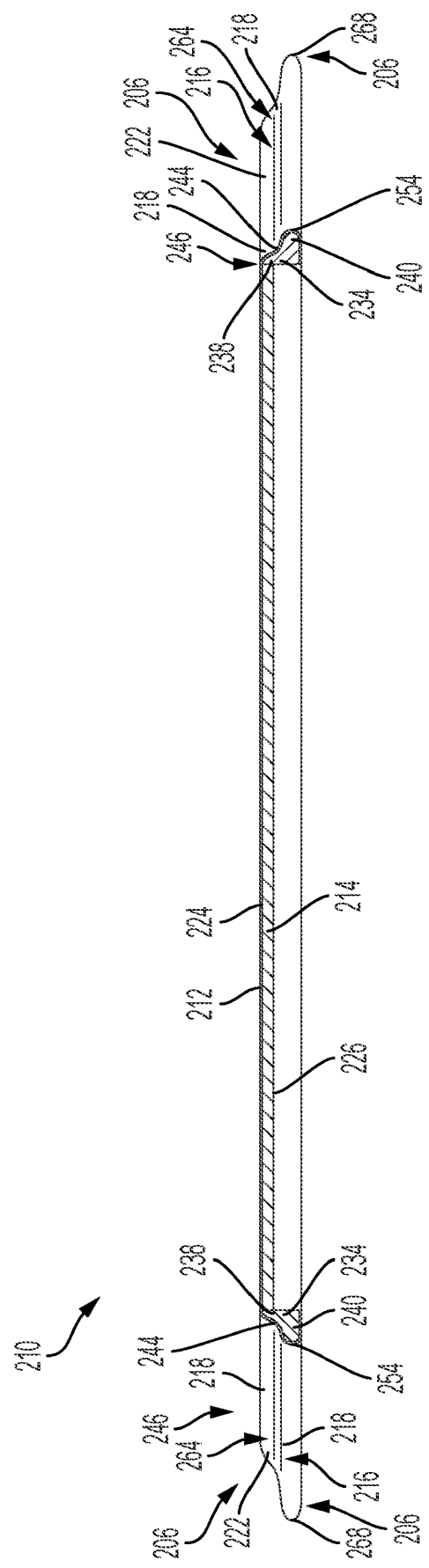
FIG. 14 is a cross-sectional view of the countertop of FIG. 12, taken along line 14-14.
Figure 15:
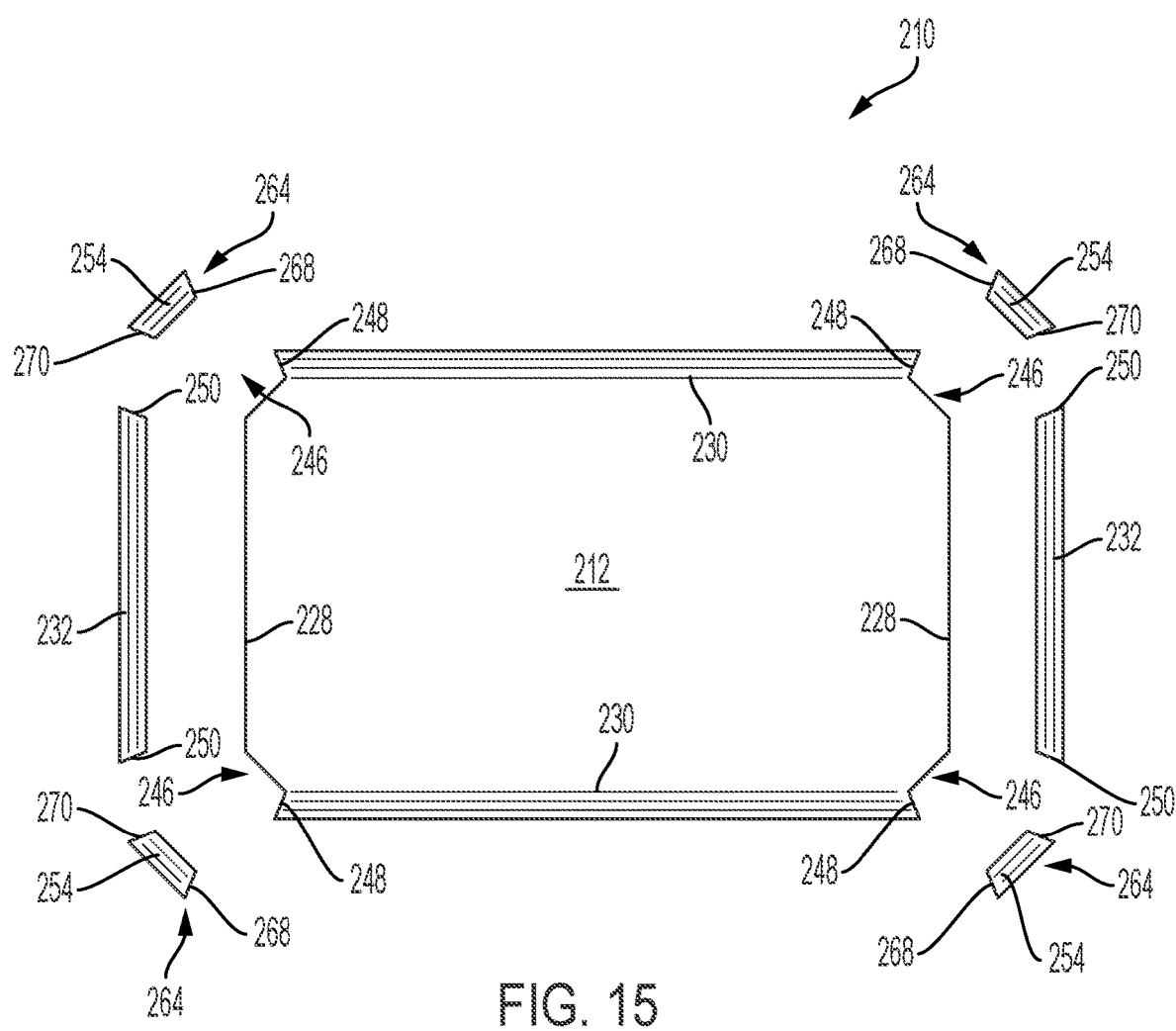
FIG. 15 is a top exploded view of the countertop of FIG. 12.
Figure 16:
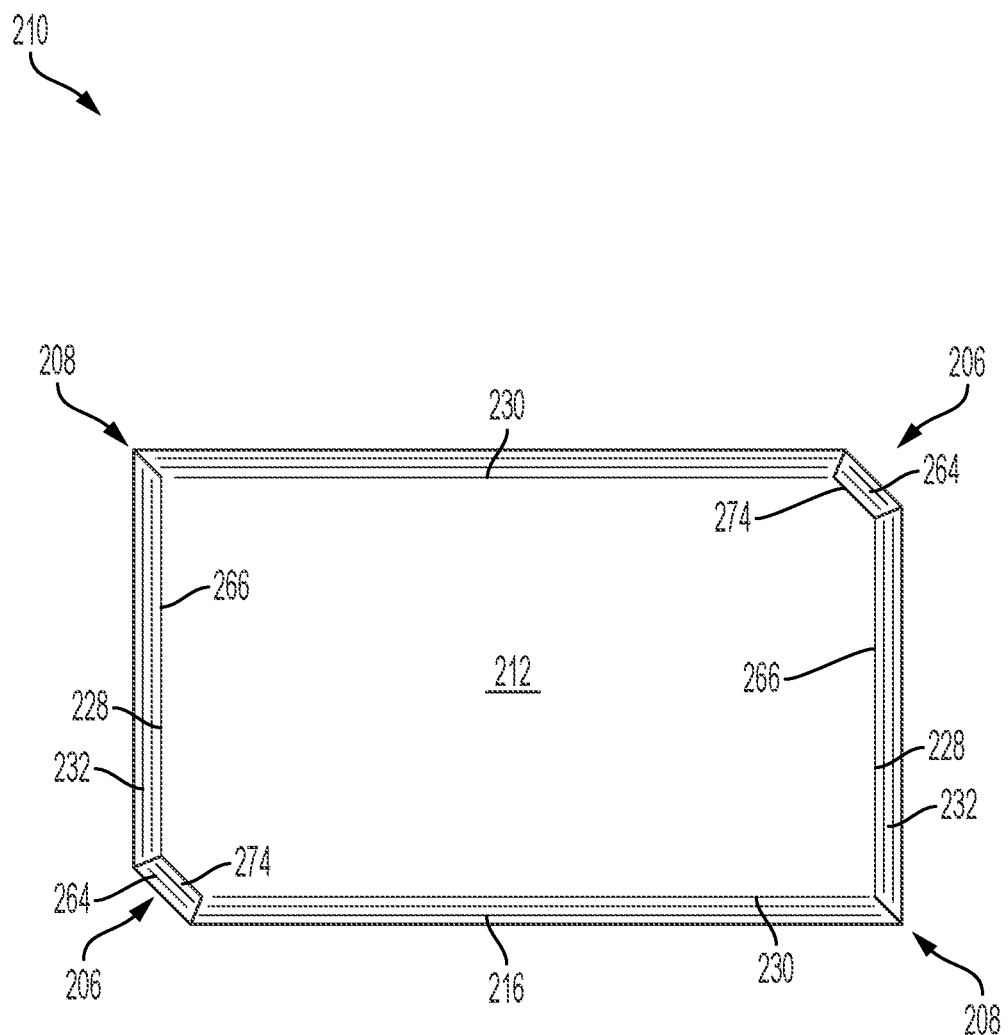
FIG. 16 is a top view of another example of a laminate countertop including both square and angled corners, according to an aspect of the disclosure.

As shown in FIGS. 12, 13A, and 13B, there is a latitudinal seam 266 extending between the laminated surface of the straight edge member 232 and the surface of the laminate cover 212 covering the top surface 224 of the base support 214. As in previous examples, the seam 266 should be made to be as inconspicuous as possible, so that the laminate countertop 210 more closely resembles a countertop formed from natural stone or a synthetic solid material. For example, the latitudinal seam 266 can be positioned along at an inflection point between the curved surface defined by the curved edge profile 216 of the straight edge member 232 and the flat surface 222 of the laminate covered base support 214, such that the top surface 224 of the laminate covered base support 214 is not co-planer with any portion of surfaces of the edge member 232.

The preformed straight edge member 232 of the laminate countertop 210 can be manufactured according to the method described previously in connection with FIG. 7. Accordingly, as in previous examples, the straight edge member 232 can include a pre-stamped laminate cover 254 formed from the cured resin material. The pre-stamped laminate cover 254 is stamped as the curved edge profile 216, so that a plug of the straight edge member 232 can be received within the laminate cover 254. An outer surface of the plug is adhered to the inner surface of the laminate cover 254, as in previous examples.

The laminate countertop 210 also includes the at least one angled edge member 264 having the curved edge profile 216. The angled edge member 264 is positioned within and connected to the cutout section 246 of the base support 214. For example, a first angled side 268 of the edge member 264 can be in face-to-face contact with the first angled side 248 of the cutout section 246 and the second angled side 270 of the edge member 264 can be in face-to-face contact with the second angled side 250 of the cut out section 246. Further, a rear facing side of the angled edge member 264 can be adhered to the connecting cut of the cutout section 246.

The angled edge member 246 is generally structurally similar or identical to the straight edge member 232. For example, the angled edge member 264 can include, for example, a plug 234 having an upper lip portion 238 and a lower lip portion 240. As in previous examples, the plug 234 is formed from an elongated member comprising a synthetic polymer material, such as an elongated member comprising closed-cell PVC foam. An outer surface 244 of the plug 234 defines the curved edge profile 216. The preformed straight edge member 232 also includes the pre-stamped laminate cover 254 attached to the outer surface 244 of the edge member 264. When mounted within the cutout section 246, the angled edge member 264 is a portion of a substantially continuous curved edge profile 216, extending from the straight edge member 232, around the angled corner 206, and to the longitudinal side 230 of the countertop 210. There can be an angled seam 274 between the laminate cover 254 of the angled edge member 264 and the surface of the laminated base support 214. As discussed previously, seams 266 are positioned to be as inconspicuous as possible. For example, as was the case with seam 266, the angled seam 274 can be positioned at an inflection point between a flat surface and a curved surface. As discussed in connection with previous embodiments, positioning seams at an inflection point between a flat surface and a curved surface is believed to make seams less conspicuous than if seams were present between, for example, two flat surfaces.

Figure 18:
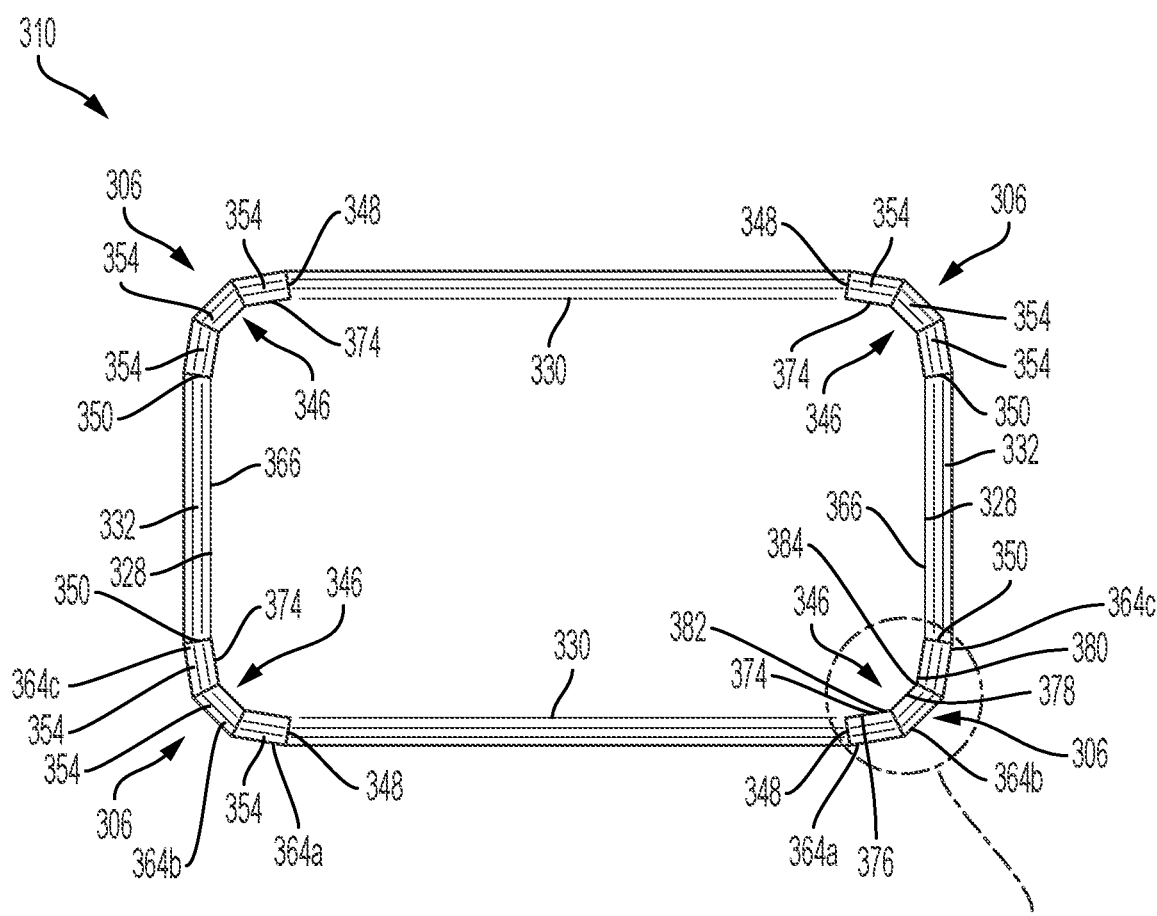
FIG. 18 is a top view of another example of a laminate countertop with angled corners comprising multiple angled pieces, according to an aspect of the disclosure.
Figure 19:
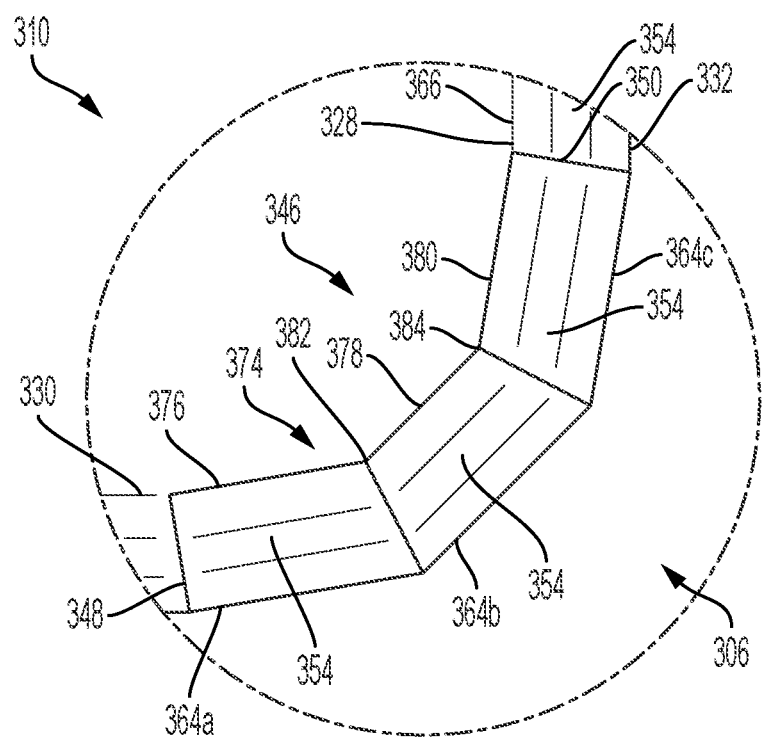
FIG. 19 is an enlarged top view of the angled corner of the countertop of FIG. 18.

With reference now to FIGS. 18 and 19, in some examples, an angled corner 306 can be formed from multiple segments or pieces. For example, the countertop 310 includes an angled corner 306 formed from three angled pieces or members. As in previous examples, the countertop 310 includes the base support, the laminate cover, and the straight edge member 332 attached to the latitudinal side 328 of the base support 314. Also, the base support 314 includes the cutout section 346, as in the previous example. The cutout section 346 includes the first angled side 348 extending inwardly from the longitudinal side 330 of the base support 314 and the second angled side 350 extending inwardly from the latitudinal side 328 of the base support 314. Angled seams 374 extend between the cutout section 346 and the base support 314.

However, unlike in the previous examples, the angled corner 306 includes multiple segments with different angles. For example, the angled seam 374 can include a first segment 376, extending from the first side 348 to a first intermediate point 382, a second segment 378 extending from the first intermediate point 382 to a second intermediate point 384, and a third segment 380 extending between the second intermediate point 384 and the second angled side 350. Angled edge members are connected in the cutout section 346 to form the angled corner 306. For example, the countertop 310 can include a first angled edge member 364a, a second angled edge member 364b, and a third angled edge member 364c. The first angled edge member 364a is connected to the first angled side 348 and the first segment 376. The second angled edge member 364b is connected adjacent to the first angled edge member 364a and to the second segment 378. The third angled edge member 364c is connected between the second angled edge member 364b and the second angled side 350 of the cutout section 346. The angled edge members 364a, 364b, 364c are formed in the same manner as previously described edge members and include the plug connected to the pre-stamped laminate cover 354. The connected angled edge members 364a, 364b, 364c form the angled corner 306 with three separate surfaces arranged such that the curved edge profile 316 appears to extend continuously over the entire angled corner 306. Angled sides of the edge members 364a, 364b, 364c can be cut to fit securely within the cutout section 346. In some instances, all of the edge members 364a, 364b, 364c can have sides cut to the same angle (e.g., an angle of 30° as shown in FIGS. 18 and 19). In other examples, angled sides can be cut to different angles to achieve different corner designs.

Method of Forming a Countertop with an Angled Edge Member

A method for forming a laminate countertop 210 including the angled corner 206 and curved edge profile 216 will now be described. Generally, the manufacturing method is performed at a laminate countertop manufacturing facility. Such facilities can produce countertops in standard sizes and layouts, as well as customized countertops based on designs selected for specific installation projects. Desirably, the countertop 210 is sold in a finished, completed state with all edge members 232, 264 attached in place, such that no flat or unfished sides are visible. In particular, it is believed that it is easier to align the edge members 232, 264 with the base support 214 using machinery including braces, roller assemblies, and supports at the manufacturing facility.

In contrast, attempting to mount a preformed edge member or molded piece to a countertop at an installation site does not achieve desirable results, since it is difficult to properly align the edge member with the base support without using braces, jigs, rolling assemblies, and other supports to ensure that the base support and the edge member(s) are properly aligned. Accordingly, when molded edge pieces are connected to installed countertops (e.g., countertops that have already been mounted to cabinetry), the seams between the previously installed countertop and the molded edge pieces are often clearly visible, which provides unsatisfactory results.

Figure 20:
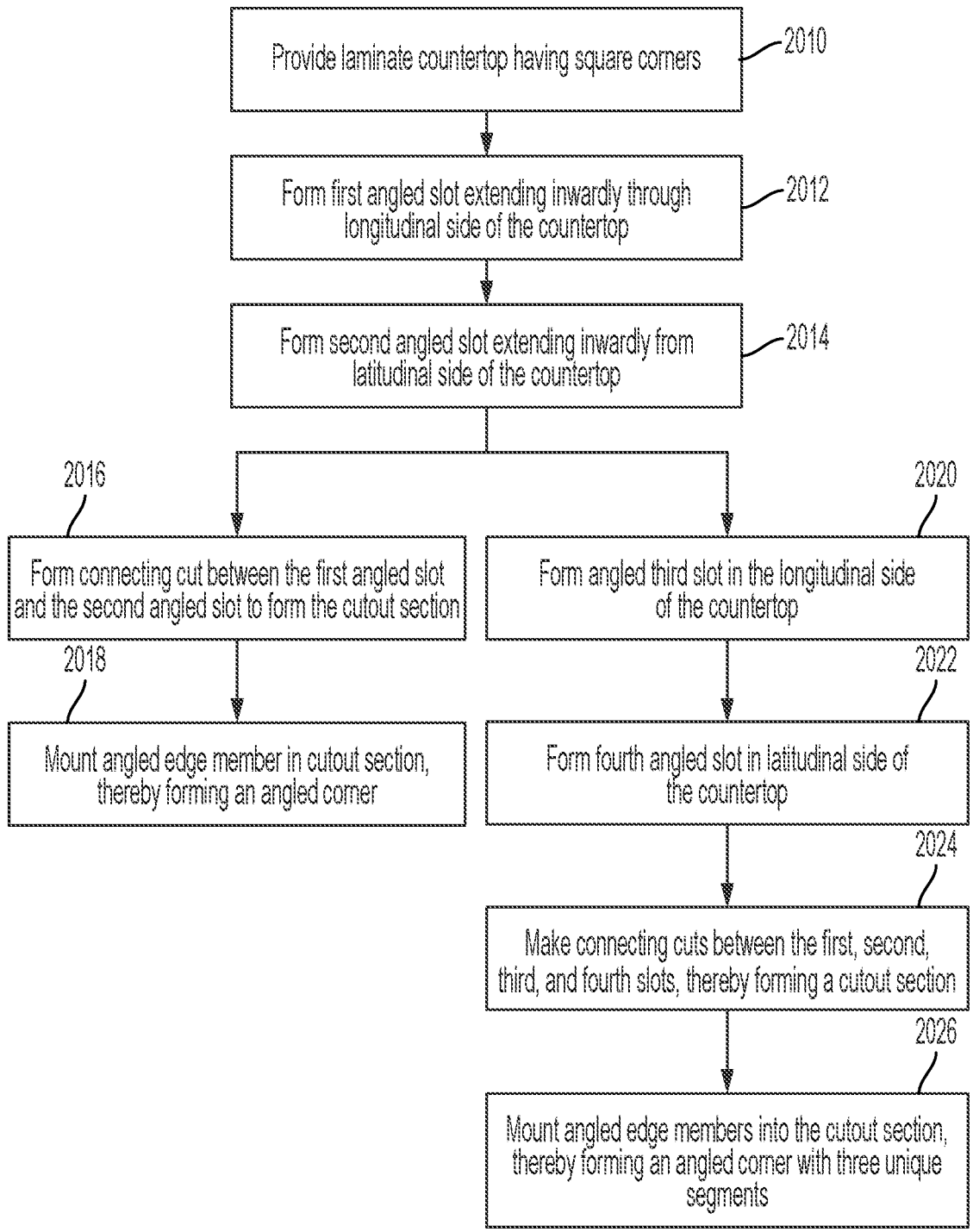
FIG. 20 is a flow chart showing steps for making a laminate countertop with angled corners, according to an aspect of the disclosure.

Steps for an exemplary method for forming the laminate countertop 210 including the angled corner(s) 206 and curved edge profile 216 are shown in FIG. 20. At step 2010, a laminate countertop 210 with at least one square corner 208 having the curved edge profile 216 extending around the at least one square corner 208 is provided. The laminate countertop 210 with the square corner 208 can be similar in size and construction to previously described exemplary countertops shown, for example, in FIGS. 1A-4. The provided laminate countertop 210 can include, for example, the base support 214, laminate cover 212, and at least one preformed straight edge member 232 forming a portion of the at least one square corner 208. The laminate countertop 210 can be formed using methods described in connection with FIGS. 7 and 10.

Next, grooves or slots 412, 414 are cut into the provided countertop 210 to form the cutout section 246. In some examples, in order to cut the slots 412, 414, the provided countertop 210 can be mounted to a frame, brace, or jig device configured to hold the countertop 210 in place so that one or more cutting implements can be brought into contact with the countertop 210 to form the grooves or slots 412, 414. The slots 412, 414 can be formed using any convenient cutting instrument, such as a table saw, miter saw, or another reciprocating saw.

Figure 21:
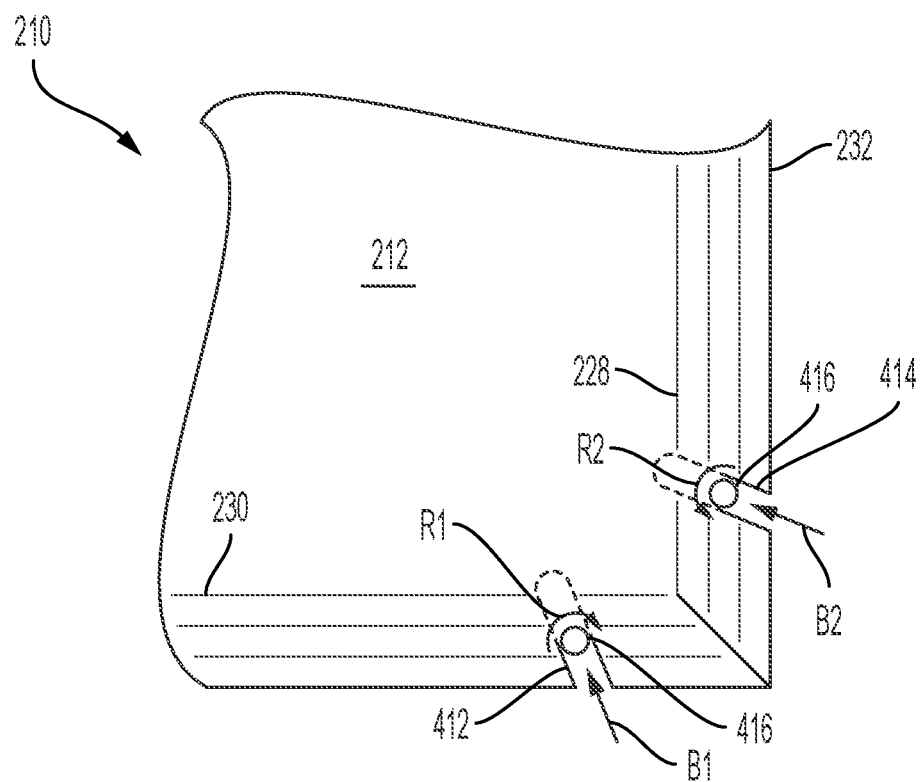
FIG. 21 is a schematic drawing showing an initial step for forming an angled corner in a laminate countertop, according to an aspect of the disclosure.

In some examples, at step 2012 and as shown schematically in FIG. 21, a first angled slot 412 is cut through a portion of the longitudinal side 230 of the countertop 210 and into the base support 214. The slot 412 can be cut by bringing a rotating router blade 416 into contact with the longitudinal side 230 and cutting through the longitudinal side 230 in a direction of arrow B1 to form the slot 412. Desirably, the router blade 416 turns in a first direction (shown in arrow R1), to avoid chipping or damaging portions of the provided countertop 210.

At step 2014, the second slot 414 is formed by the same or a different router blade to cut into the preformed edge member 232 of the countertop 210. For example, the second slot 414 can be cut by bringing the router blade 416 into contact with the preformed edge member 232 at a selected location and advancing the router blade 416 into the base support 214 in a direction of arrow B2. Desirably, the router blade 416 used to form the second slot 414 rotates in an opposite direction (shown by arrow R2) from the router blade 416 used to form the first slot 412. Using router blades that rotate inwardly (e.g., towards the cutout portion 246) helps to reduce chipping of the base support 214 and laminate cover 212, thereby producing a crisper and more aesthetically appealing cut(s).

Figure 22:
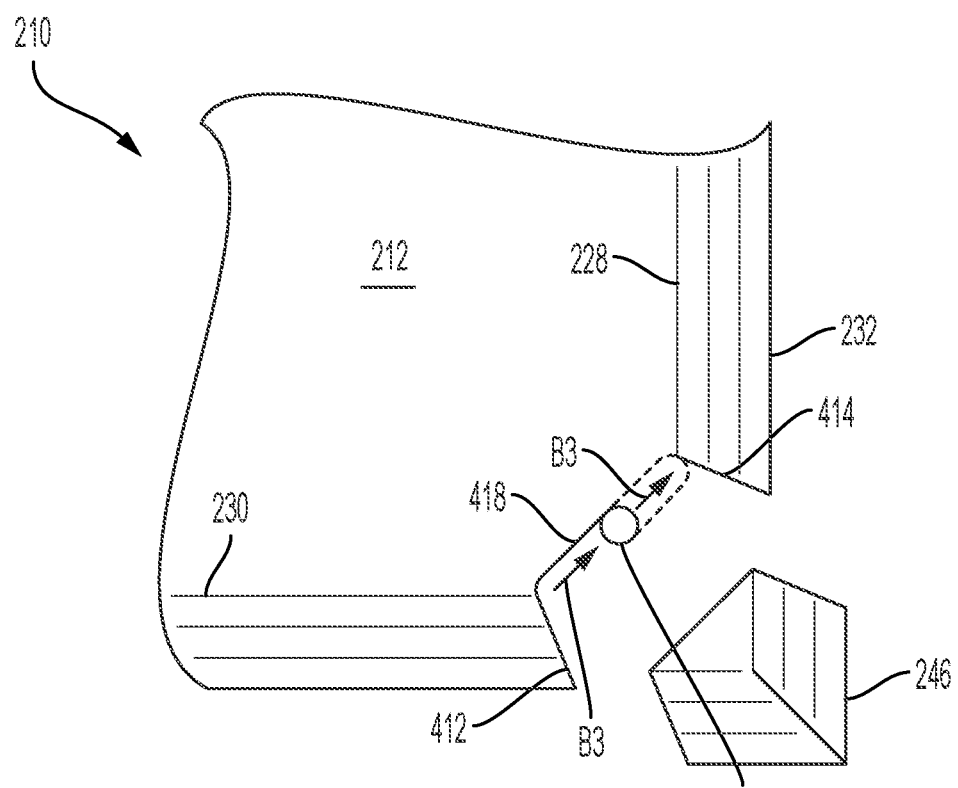
FIG. 22 is a schematic drawing showing another step for forming the angled corner in the laminate countertop.

At step 2016, a connecting cut 418 is made between the slots 412, 414, as shown in FIG. 22. For example, the connecting cut 418 can be formed by advancing one of the router blades 416 between the first slot 412 and the second slot 414 in a direction of arrow B3. Desirably, the router blade 416 forming the connecting cut 418 also rotates in an inward direction (e.g., towards the cutout section 246) to avoid chipping the cover 212 or base support 214. The connecting cut 418 between the slots 412, 414 forms the cutout section 246 of the base support 214. The cutout section 246 can be discarded.

After the cutout section 246 is discarded, the preformed angled edge member 264 is mounted or adhered into the cutout section 246 at step 2018. As discussed previously, the angled edge member 264 is sized to fit securely in the cutout section 246, such that it appears to create a continuous curved edge profile 216 extending around the angled corner 206. The angled edge member 264 can be adhered in place using conventional epoxy adhesives as are known in the art. In order to provide a tight secure fit, the angled edge member 264 includes the angled sides 268, 270 configured to be in face-to-face contact with the angled sides 248, 250 of the cutout section 246. It is noted that unlike for the straight edge member 232, which remains connected to a brace as it is adhered to the base support 214, the angled edge member 264 can be adhered into the cutout section 246 using conventional clamps. The angled edge member 246 does not need to be mounted to a brace. This is the case since the angled edge member 264 is shorter than the straight edge member 232. Accordingly, problems of bowing or curving, which can occur with the longer straight edge member 232, are less likely to occur.

Figure 23:
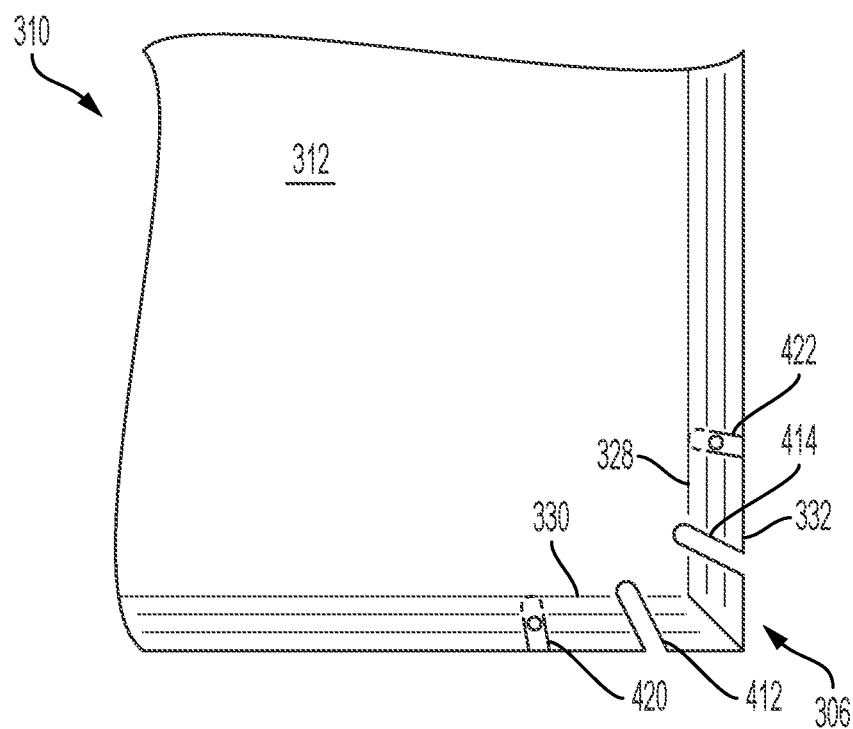
FIG. 23 is a schematic drawing showing a step for forming an angled corner in a laminate countertop having three angled surfaces, according to an aspect of the disclosure.

In order to form an angled corner 306 having multiple angled surfaces, as shown in FIGS. 18 and 19, a router is used to form additional slots extending inwardly from the longitudinal side 330 and the preformed straight edge member 332 of the countertop 310. For example, the first slot 412 and the second slot 414 can be formed, as described in steps 2012 and 2014. Next, in optional step 2020 and as shown at FIG. 23, a third slot 420 is formed extending inwardly from the longitudinal side 330 and into the base support 314 of the countertop 310. As shown in FIG. 23, the first slot 412 is located between the third slot 420 and the square corner of the countertop 310. In a similar manner, also as shown in FIG. 23, at optional step 2022, a fourth slot 422 is formed extending inwardly through the preformed edge member 332 and the latitudinal side 328 of the base support 314. The second slot 414 is located between the forth slot 422 and the square corner of the countertop 310. The angled slots 420, 422 can be cut using a rotating router blade in the same manner as the first and second slots 412, 414. The slots 420, 422 can be cut at the same angles as the slots 412, 414 to give the angled corner 306 a uniform appearance. In other examples, the slots 412, 414, 420, 422 can be cut at different angles (e.g., at different angles relative to the longitudinal side 330 or latitudinal side 328 of the countertop 310) to give the angled corner 306 a less uniform appearance.

Figure 24:
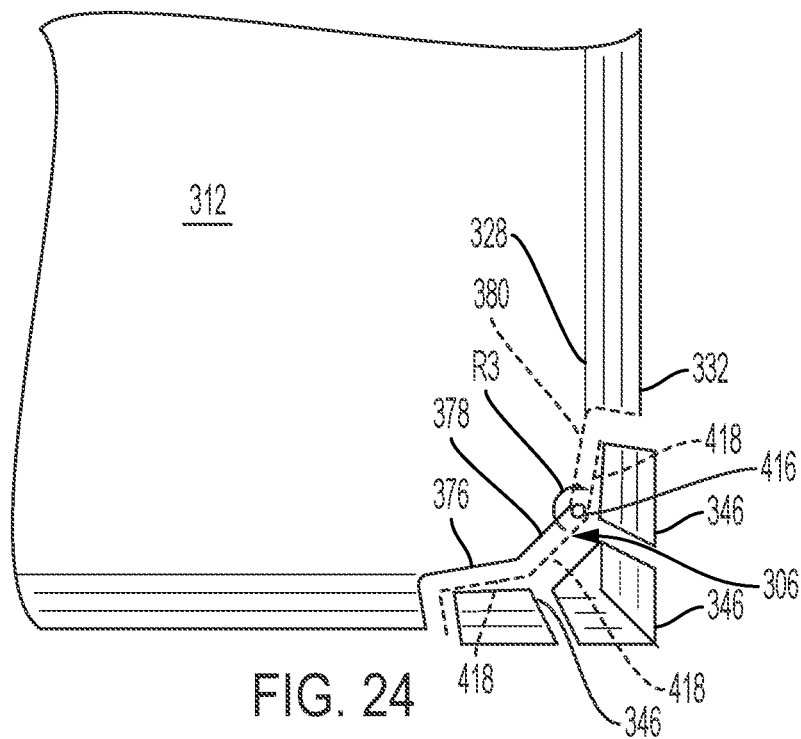
FIG. 24 is a schematic drawing showing another step for forming the angled corner having three angled surfaces, according to an aspect of the disclosure.

After the slots 420, 422 are formed, in step 2024, connecting cut(s) 418 are made between the slots 412, 414, 420, 422, as shown in FIG. 24. For example, a straight connecting cut can be made between the third slot 420 and the first slot 412, which forms the first seam or segment 376. Another straight connecting cut can be made between the first slot 412 and the second slot 414, which forms the second seam or segment 378. A final connecting cut can be made between the second slot 414 and the fourth slot 422, which forms the third seam or segment 380. As in previous examples, the connecting cut(s) can be made using a router. The router can be configured with the blade 416 turning towards the cutout sections 346 in a direction of arrow R3 to reduce chipping of the laminate cover 312. Forming the connecting cuts produces a number of cutout sections 346, which can be discarded.

Once the connecting cuts 418 are completed, thereby forming the cutout section(s) 346 as shown in FIG. 24, at step 2026, preformed angled edge members 364a, 364b, 364c are adhered in the cutout section 346 to form the angled corner 306, as shown in FIGS. 18 and 19. Specifically, the angled edge members 364a, 364b, 364c are connected side by side, thereby forming the continuous curved edge profile 316 extending around the angled corner 306. In some examples, the three angled edge members are the same size and shape, thereby forming a corner 306 with a uniform symmetrical appearance, as shown in FIGS. 18 and 19. In other examples, the edge members 364a, 364b, 364c can be different sizes or cut at different angles, providing a more customized and unique shaped angled corner.

It is to be understood that the invention may assume various alternative variations, except where expressly specified to the contrary. It is also to be understood that the specific devices illustrated in the attached drawings, and described in the specification, are simply exemplary embodiments of the invention. Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope thereof. For example, it is to be understood that the present invention contemplates that, to the extent possible, one or more features of any embodiment can be combined with one or more features of any other embodiment. The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

The invention claimed is:

1. A laminate countertop with a curved edge profile, comprising:
   a base support comprising a synthetic polymer material, the base support having a top surface, a bottom surface, opposing longitudinal sides, wherein the curved edge profile is carved on or molded to at least one of the opposing longitudinal sides, and opposing latitudinal sides, wherein the curved edge profile comprises an upper lip comprising an outwardly facing first convexly curved portion, a lower lip comprising an outwardly facing second convexly curved portion, and a flat vertical or angled portion extending between the first convexly curved portion and the second convexly curved portion;
   a laminate cover formed from a cured resin material adhered to and covering at least a portion of the top surface and at least a portion of the curved edge profile of the base support; and
   at least one preformed straight edge member having the curved edge profile connected to at least one of the latitudinal sides of the base support, such that the curved edge profile extends around a corner of the countertop,
   wherein the at least one preformed straight edge member comprises a plug comprising the synthetic polymer material having an outer surface comprising the curved edge profile, and a pre-stamped laminate cover formed from the cured resin material stamped in the curved edge profile adhered to the outer surface of the plug, and
   wherein the plug comprises a plurality of weep holes that extend from the outer surface of the plug to an inner surface of the plug, the plurality of weep holes being positioned to direct excess flowable adhesive away from a space between the pre-stamped laminate cover and the plug toward the inner surface of the plug.

2. The laminate countertop of claim 1, wherein the base support is about 0.5 inch to about 1.0 inch (about 12.5 mm to about 25 mm) thick.

3. The laminate countertop of claim 1, wherein the synthetic polymer material comprises a closed-cell polyvinyl chloride foam.

4. The laminate countertop of claim 3, wherein the closed-cell polyvinyl chloride foam has a density of about 0.25-1.0 g/cm$^3$.

5. The laminate countertop of claim 1, wherein the synthetic polymer material is substantially non-hygroscopic.

6. The laminate countertop of claim 1, wherein the base support defines at least one cutout section at a corner of the base support between one of the longitudinal sides and one of the latitudinal sides thereof,
   the countertop further comprising at least one preformed angled edge member having the curved edge profile connected to the at least one cutout section of the base support to form the curved edge profile extending around an angled corner of the laminate countertop.

7. The laminate countertop of claim 6, wherein the at least one preformed angled edge member comprises:
   an angled plug formed from the synthetic polymer material having an outer surface comprising the curved edge profile; and
   an angled pre-stamped laminate cover formed from the cured resin material stamped in the curved edge profile adhered to the outer surface of the angled plug.

8. The laminate countertop of claim 7, wherein the synthetic polymer material comprises a closed-cell polyvinyl chloride foam.

9. The laminate countertop of claim 8, wherein the closed-cell polyvinyl chloride foam has a density of about 0.25-1.0 g/cm$^3$.

10. The laminate countertop of claim 1, wherein the plug further comprises an adhesive channel on the inner surface of the plug.

11. A laminate countertop with a curved edge profile, comprising:
    a base support comprising a synthetic polymer material, the base support having a top surface, a bottom surface, opposing longitudinal sides, wherein the curved edge profile is carved on or molded to at least one of the opposing longitudinal sides, and opposing latitudinal sides, wherein the curved edge profile comprises an upper lip comprising an outwardly facing first convexly curved portion, a lower lip comprising an outwardly facing second convexly curved portion, and a flat vertical or angled portion extending between the first convexly curved portion and the second convexly curved portion;
    a laminate cover formed from a cured resin material adhered to and covering at least a portion of the top surface and at least a portion of the curved edge profile of the base support; and
    at least one preformed straight edge member having the curved edge profile connected to at least one of the latitudinal sides of the base support, such that the curved edge profile extends around a corner of the countertop,
    wherein the at least one preformed straight edge member comprises:
      a plug comprising the synthetic polymer material having an outer surface comprising the curved edge profile;
      a pre-stamped laminate cover formed from the cured resin material stamped in the curved edge profile adhered to the outer surface of the plug; and
      a plurality of brace holes extending through the pre-stamped laminate cover into a bottom surface of the plug, the plurality of brace holes being positioned to receive hooks of a brace for securing the at least one preformed straight edge member to the brace for adhering the pre-stamped laminate cover to the plug.

12. The laminate countertop of claim 11, wherein the plurality of brace holes are spaced longitudinally apart along the at least one preformed straight edge member.

13. The laminate countertop of claim 11, wherein the base support is about 0.5 inch to about 1.0 inch (about 12.5 mm to about 25 mm) thick.

14. The laminate countertop of claim 11, wherein the synthetic polymer material comprises a closed-cell polyvinyl chloride foam.

15. The laminate countertop of claim 14, wherein the closed-cell polyvinyl chloride foam has a density of about 0.25-1.0 g/cm$^3$.

16. The laminate countertop of claim 11, wherein the synthetic polymer material is substantially non-hygroscopic.

17. A method of forming the laminate countertop of claim 1, comprising:
    providing the base support formed from the synthetic polymer material;

adhering the laminate cover over at least a portion of the top surface and a portion of the curved edge profile of the base support; and connecting the at least one preformed straight edge member having the curved edge profile to at least one of the latitudinal sides of the base support, such that the curved edge profile extends around a corner of the countertop to form the laminate countertop.

18. The method of claim 17, further comprising;

cutting a first angled slot through a portion of a longitudinal side of the countertop;

cutting a second angled slot through a portion of the preformed straight edge member;

cutting a connecting cut between the first and second angled slots to form a cutout section of the laminate countertop, the cutout section comprising at least a portion of the corner of the laminate countertop; and adhering at least one preformed angled edge member comprising the curved edge profile into the cutout section of the laminate countertop to form at least one angled corner, thereby providing the laminate countertop with the curved edge profile extending around the at least one angled corner of the countertop.

\* \* \* \* \*